(12) United States Patent
Takahama

(10) Patent No.: US 12,203,242 B2
(45) Date of Patent: Jan. 21, 2025

(54) MAP GENERATION SYSTEM AND MAP GENERATION METHOD

(71) Applicant: Komatsu Ltd., Tokyo (JP)

(72) Inventor: Kazuhisa Takahama, Tokyo (JP)

(73) Assignee: KOMATSU LTD., Tokyo (JP)

( * ) Notice: Subject to any disclaimer, the term of this patent is extended or adjusted under 35 U.S.C. 154(b) by 477 days.

(21) Appl. No.: 17/600,224

(22) PCT Filed: May 26, 2020

(86) PCT No.: PCT/JP2020/020670
§ 371 (c)(1),
(2) Date: Sep. 30, 2021

(87) PCT Pub. No.: WO2020/241618
PCT Pub. Date: Dec. 3, 2020

(65) Prior Publication Data
US 2022/0178114 A1 Jun. 9, 2022

(30) Foreign Application Priority Data

May 31, 2019 (JP) .................................. 2019-103161

(51) Int. Cl.
*E02F 9/26* (2006.01)
*E02F 9/20* (2006.01)
(Continued)

(52) U.S. Cl.
CPC .............. *E02F 9/264* (2013.01); *E02F 9/205* (2013.01); *E02F 9/261* (2013.01); *G01S 17/08* (2013.01); *G01S 17/89* (2013.01); *G05D 1/0038* (2013.01)

(58) Field of Classification Search
CPC ........... E02F 9/264; E02F 9/205; E02F 9/261; E02F 3/435; G01S 17/08; G01S 17/89;
(Continued)

(56) References Cited

U.S. PATENT DOCUMENTS

2018/0051446 A1* 2/2018 Yoshinada .............. E02F 9/264
2018/0245449 A1* 8/2018 Raffuzzi ................ G01B 5/207
(Continued)

FOREIGN PATENT DOCUMENTS

JP 2008-303574 A 12/2008
JP 2016-160741 A 9/2016
(Continued)

*Primary Examiner* — Anne Marie Antonucci
*Assistant Examiner* — Jodi Jones
(74) *Attorney, Agent, or Firm* — Locke Lord LLP

(57) ABSTRACT

An aspect of the invention is a map generation system including a three-dimensional data acquisition unit configured to acquire three-dimensional data from a scanning distance measurement sensor measuring a distance to a target to be measured, an operation information acquisition unit configured to acquire operation information representing an operation of a work machine occurring in a cycle of update of the three-dimensional data by the scanning distance measurement sensor, and a three-dimensional data correction unit configured to remove a portion corresponding to the work machine in the three-dimensional data based on the operation information.

8 Claims, 15 Drawing Sheets

(51) Int. Cl.
*G01S 17/08* (2006.01)
*G01S 17/89* (2020.01)
*G05D 1/00* (2024.01)

(58) Field of Classification Search
CPC .......... G05D 1/0038; G05D 2201/0202; G06T 2207/10028; G06T 2207/20221; G06T 2207/30252; G06T 5/005; G06V 20/56; G06V 2201/06; G06V 20/64; G01C 15/00
USPC ..... 701/50, 28, 36, 301, 532, 409, 410, 448, 701/446, 65, 55
See application file for complete search history.

(56) References Cited

U.S. PATENT DOCUMENTS

| | | |
|---|---|---|
| 2019/0024348 A1 | 1/2019 | Hiekata |
| 2020/0058177 A1 | 2/2020 | Kawamoto et al. |

FOREIGN PATENT DOCUMENTS

| | | |
|---|---|---|
| JP | 2017-155491 A | 9/2017 |
| WO | 2019/044316 A1 | 3/2019 |

* cited by examiner

MAP GENERATION SYSTEM AND MAP GENERATION METHOD

TECHNICAL FIELD

The present invention relates to a map generation system and a map generation method. Priority is claimed on Japanese Patent Application No. 2019-103161, filed May 31, 2019, the content of which is incorporated herein by reference.

BACKGROUND ART

In a case where a work machine is remotely operated, a displayed image is two-dimensional in an operation using an image viewed from an operator of the work machine, and accordingly, a sense of perspective is poor. For this reason, it is difficult to recognize a distance between a work target and the work machine, and there is a possibility that work efficiency is degraded. Even in a case where the operator who boards the work machine operates work equipment, it may be difficult to recognize the distance between the work equipment and the work target depending on the level of skill of the operator, and there is a possibility that work efficiency is degraded. An example of an image display system for solving such a problem is described in Patent Document 1. The image display system described in Patent Document 1 includes an imaging device that is attached to a work machine provided with work equipment having a work tool, a posture detection device that detects a posture of the work equipment, a distance detection device that obtains information regarding a distance to a work target of the work machine, and a processing device that generates an image of a portion corresponding to the work tool on the work target facing the work tool using information regarding a position of the work tool obtained using the posture of the work equipment and information regarding a position of the work target obtained from information regarding the distance obtained by the distance detection device and combines the generated image with an image of the work target captured by the imaging device to display a combined image on a display device. With the image display system described in Patent Document 1, it is possible to suppress degradation of work efficiency in working using the work machine provided with the work equipment having the work tool.

In the image display system described in Patent Document 1, information regarding a distance to the work equipment may be included in information regarding the distance detected by the distance detection device along with information regarding the distance to the work target. Accordingly, in the image display system described in Patent Document 1, a portion included in an occupied area that is an area occupied by the work equipment in information regarding the distance detected by the distance detection device is removed. In this case, in the image display system described in Patent Document 1, the processing device compares information indicating the position or posture of the work tool detected by the posture detection device with information regarding the distance detected by the distance detection device and determines to be information in the occupied area in a case where both match. According to this configuration, it is possible to avoid distortion of an image that occurs in a case where the occupied area is not removed.

CITATION LIST

Patent Document

[Patent Document 1]
Japanese Unexamined Patent Application, First Publication No. 2016-160741

SUMMARY OF INVENTION

Technical Problem

In the image display system described in Patent Document 1, the detection of the position or posture of the work tool using the posture detection device and the detection of the distance using the distance detection device are performed, for example, asynchronously. In this case, there is a problem in that an error may occur in determination of matching due to deviation in detection timing. In a case where a scanning distance measurement sensor that detects a distance while a plurality of measurement points are sequentially scanned is used as the distance detection device, there is a problem in that an error of determination of matching increases is large when the position or posture of the work equipment is changed in one scanning period.

The invention has been accomplished in view of the above-described situation, and an object of the invention is to provide a map generation system and a map generation method capable of solving the above-described problems.

Solution to Problem

To solve the above-described problems, there is provided a map generation system according to an aspect of the invention including a measurement data acquisition unit configured to acquire measurement data from a scanning distance measurement sensor measuring a distance to a target to be measured, an operation information acquisition unit configured to acquire operation information representing an operation of a work machine occurring in a cycle of update of the measurement data by the scanning distance measurement sensor, and a measurement data correction unit configured to remove a portion corresponding to the work machine in the measurement data based on the operation information.

Advantageous Effects of Invention

According to the aspect of the invention, it is possible to reduce an error in determination about whether or not to remove the portion corresponding to the work machine in the measurement data.

DESCRIPTION OF EMBODIMENTS

Figure 1:
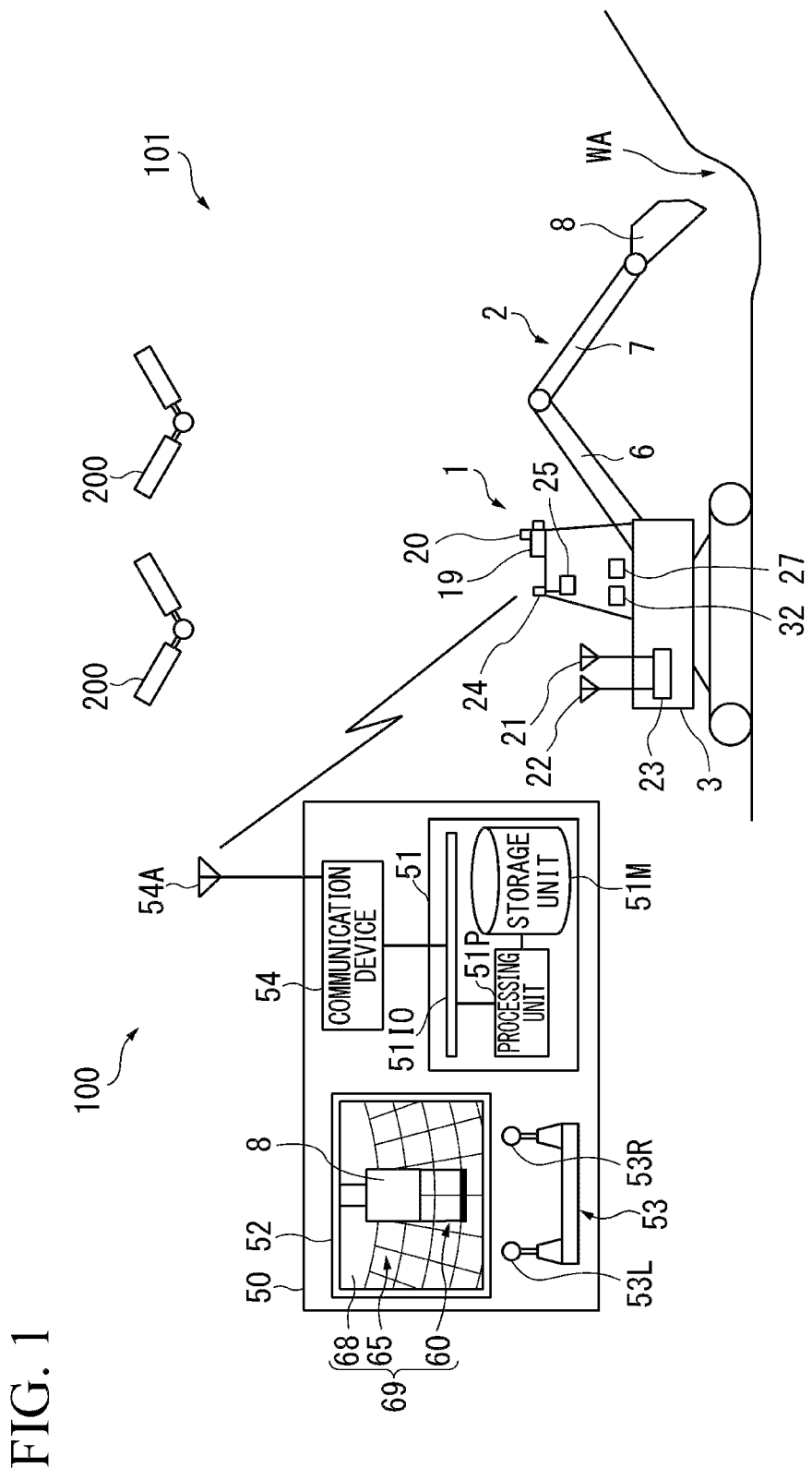
FIG. 1 is a diagram showing an image display system for a work machine and a remote operation system for a work machine according to an embodiment.

A mode (embodiment) for carrying out the invention will be described in detail referring to the drawings. In the drawings, the same or corresponding components are represented by the same reference numerals, and description thereof will not be repeated.

<Outline of Image Display System of Work Machine and Remote Operation System of Work Machine>

FIG. 1 is a diagram showing an image display system 100 (map generation system) for a work machine and a remote operation system 101 for a work machine according to the embodiment. The image display system 100 for a work machine (hereinafter, appropriately referred to as an image display system 100) images a work target of a hydraulic excavator 1, and more specifically, a terrain surface as a target of work by the work equipment 2 provided in the hydraulic excavator 1, that is, a work target WA and a bucket 8 as a work tool with an imaging device 19 and displays obtained images on a display device 52 when an operator remotely operates the hydraulic excavator 1 as the work machine. In this case, the image display system 100 displays an image 69 for work including an image 68 of the work target WA captured by the imaging device 19, a lattice image 65, and an image 60 for indicating a position of the bucket 8 on the work target WA, on the display device 52.

The image display system 100 includes the imaging device 19, a posture detection device 32, a distance detection device 20, and a processing device 51. The remote operation system 101 for a work machine (hereinafter, appropriately referred to as a remote operation system 101) includes the imaging device 19, the posture detection device 32, the distance detection device 20, a work equipment control device 27, the display device 52, the processing device 51, and an operation device 53. In the embodiment, the imaging device 19, the posture detection device 32, and the distance detection device 20 of the image display system 100 are provided in the hydraulic excavator 1, and the processing device 51 is provided in a facility 50. The facility 50 is a facility that remotely operates the hydraulic excavator 1 or manages the hydraulic excavator 1. In the embodiment, the imaging device 19, the posture detection device 32, the distance detection device 20, and the work equipment control device 27 of the remote operation system 101 are provided in the hydraulic excavator 1, and the display device 52, the processing device 51, and the operation device 53 are provided in the facility 50.

The processing device 51 of the image display system 100 includes a processing unit 51P, a storage unit 51M, and an input-output unit 51IO. The processing unit 51P is, for example, a processor, such as a central processing unit (CPU). The storage unit 51M is, for example, a random access memory (RAM), a read only memory (ROM), a hard disk drive, a storage device, or a combination thereof. The input-output unit 51IO is an interface circuit for connecting the processing device 51 and external equipment. In the embodiment, the display device 52, the operation device 53, and a communication device 54 as the external equipment are connected to the input-output unit 51IO. The external equipment that is connected to the input-output unit 51IO is not limited thereto.

The processing device 51 generates an image of a portion corresponding to the bucket 8 on the work target WA facing the bucket 8 using information regarding a position of the bucket 8 as a work tool obtained using a posture of the work equipment 2 and information regarding a position of the work target WA obtained from information regarding a distance obtained by the distance detection device 20, with the imaging device 19 as a reference. Then, the processing device 51 combines the generated image and the image of the work target WA captured by the imaging device 19 and displays a combined image on the display device 52. The work target WA is a surface on which the work equipment 2 of the hydraulic excavator 1 performs work, such as excavation or ground leveling.

The display device 52 is, for example, but is not limited to, a liquid crystal display or a projector. The communication device 54 is provided with an antenna 54A. The communication device 54 performs communication with a communication device 25 provided in the hydraulic excavator 1 to acquire information regarding the hydraulic excavator 1 or to transmit information to the hydraulic excavator 1.

The operation device 53 has a left operation lever 53L that is provided on a left side of the operator, and a right operation lever 53R that is provided on a right side of the operator. The front, rear, right, and left operations of the left operation lever 53L and the right operation lever 53R correspond to the operations of two axes. For example, an operation in a front-rear direction of the right operation lever 53R corresponds to an operation of a boom 6 of the work equipment 2 provided in the hydraulic excavator 1. An operation in a right-left direction of the right operation lever 53R corresponds to an operation of the bucket 8 of the work equipment 2. An operation in the front-rear direction of the left operation lever 53L corresponds to an operation of an arm 7 of the work equipment 2. An operation in the right-left direction of the left operation lever 53L corresponds to a swing of an upper swing body 3 of the hydraulic excavator 1.

Operation amounts of the left operation lever 53L and the right operation lever 53R are detected by, for example, a potentiometer, a Hall IC, or the like, and the processing device 51 generates a control signal for controlling an electromagnetic control valve based on detection values. The signal is sent to the work equipment control device 27 through the communication device 54 of the facility 50 and the communication device 25 of the hydraulic excavator 1. The work equipment control device 27 controls the work equipment 2 by controlling the electromagnetic control valve based on the control signal. The electromagnetic control valve will be described below.

The processing device 51 acquires an input on at least one of the left operation lever 53L and the right operation lever 53R, and generates a command for operating at least one of the work equipment 2 and the upper swing body 3. The processing device 51 transmits the generated command to the communication device 25 of the hydraulic excavator 1 through the communication device 54. The work equipment control device 27 provided in the hydraulic excavator 1 acquires the command from the processing device 51 through the communication device 25 and operates at least one of the work equipment 2 and the upper swing body 3 in association with the command.

The hydraulic excavator 1 includes the communication device 25, the work equipment control device 27, the posture detection device 32, the imaging device 19, the distance detection device 20, antennas 21 and 22, and a global position calculation device 23. The work equipment control device 27 controls the work equipment 2. The communication device 25 is connected to an antenna 24 and performs communication with the communication device 54 provided in the facility 50. The work equipment control device 27 controls the work equipment 2 and the upper swing body 3. The posture detection device 32 detects a posture of at least one of the work equipment 2 and the hydraulic excavator 1. The imaging device 19 is attached to the hydraulic excavator 1 to image the work target WA. The distance detection device 20 obtains information regarding a distance between a predetermined position of the hydraulic excavator 1 and the work target WA. The antennas 21 and 22 receive radio waves from positioning satellites 200. The global position calculation device 23 obtains global positions of the antennas 21 and 22, that is, positions in global coordinates using radio waves received by the antennas 21 and 22.

<Overall Configuration of Hydraulic Excavator 1>

Figure 2:
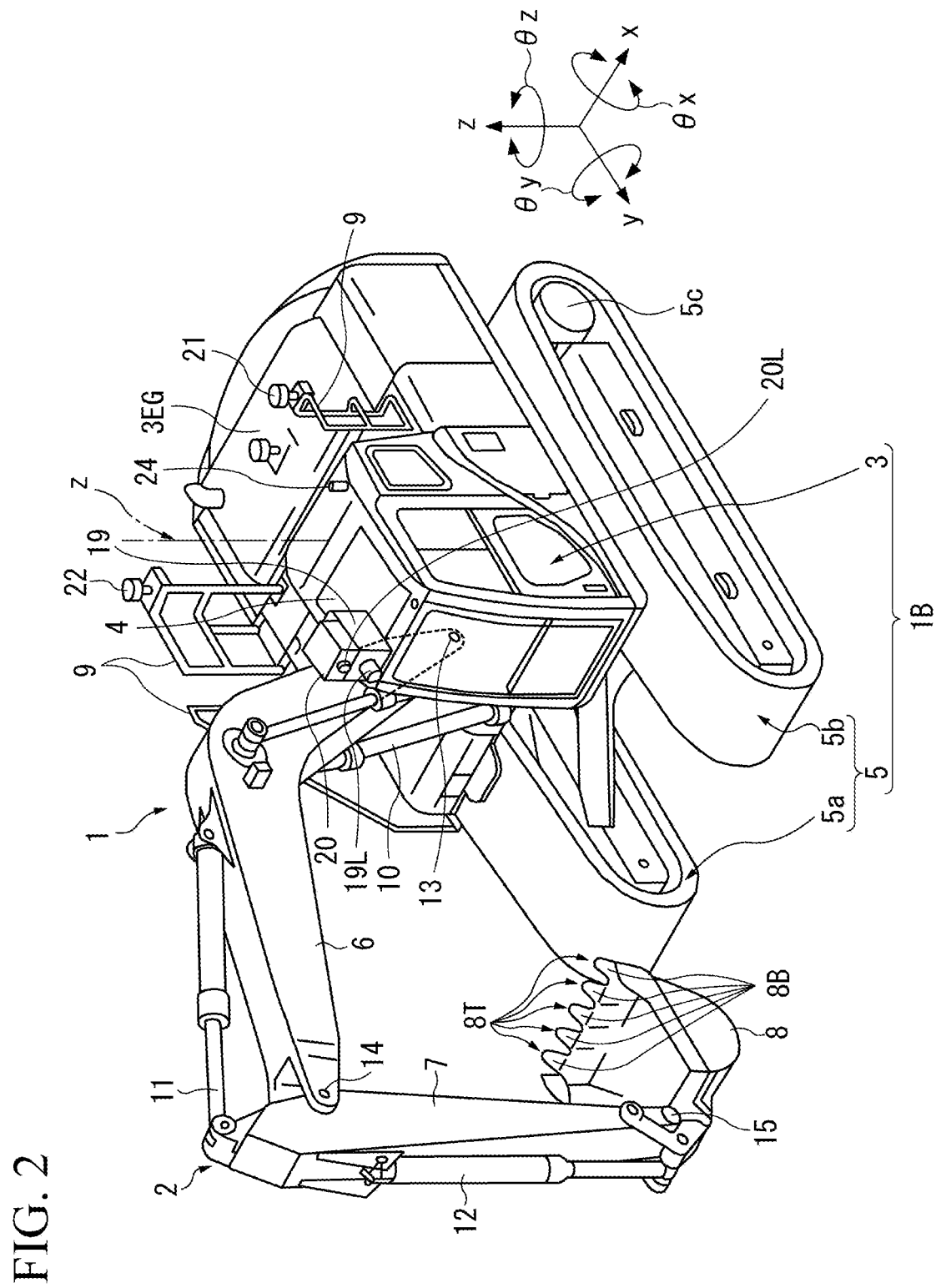
FIG. 2 is a perspective view showing a hydraulic excavator that is the work machine according to the embodiment.

FIG. 2 is a perspective view showing the hydraulic excavator 1 that is the work machine according to the embodiment. The hydraulic excavator 1 has a vehicle body 1B as a body portion and the work equipment 2. The vehicle body 1B has an upper swing body 3 that is a swing body, and a traveling device 5 as an undercarriage. The upper swing body 3 houses an engine that is a power generation device, and devices, such as a hydraulic pump, inside an engine room 3EG. In the embodiment, although the hydraulic excavator 1 uses, for example, an internal combustion engine, such as a diesel engine, for the engine that is the power generation device, the power generation device is not limited to the internal combustion engine. The power generation device of the hydraulic excavator 1 may be, for example, a so-called hybrid type device in which an internal combustion engine, a motor generator, and an electric power storage device are combined. The power generation device of the hydraulic excavator 1 may be a device in which an internal combustion engine is not provided and an electric power storage device and a motor generator are combined.

The upper swing body 3 has a cab 4. The cab 4 is provided on one end side of the upper swing body 3. That is, the cab 4 is provided on a side opposite to the side on which the engine room 3EG is disposed. Handrails 9 are attached above the upper swing body 3.

The traveling device 5 mounts the upper swing body 3. The traveling device 5 has crawlers 5a and 5b. The traveling device 5 is driven by one of or both hydraulic motors 5c provided right and left. The crawlers 5a and 5b of the traveling device 5 rotate, thereby causing the hydraulic excavator 1 to travel. The work equipment 2 is attached to a lateral side of the cab 4 of the upper swing body 3.

The hydraulic excavator 1 may include a traveling device that includes tires instead of the crawlers 5a and 5b and transmits drive power of the engine to the tires through a transmission to travel. As the hydraulic excavator 1 of such a form, for example, a wheel type hydraulic excavator is known. The hydraulic excavator 1 may be, for example, a backhoe loader having a structure in which a traveling device having such tires is provided, work equipment is attached to a vehicle body (body portion), and the upper swing body 3 and a swing mechanism thereof shown in FIG. 1 are not provided. That is, the backhoe loader has the work equipment attached to the vehicle body, and includes the traveling device that configures part of the vehicle body.

In the upper swing body 3, a side on which the work equipment 2 and the cab 4 are disposed is a front, and a side on which the engine room 3EG is disposed is a rear. A front-rear direction of the upper swing body 3 is a y-direction. A left side facing the front is a left side of the upper swing body 3, and a right side facing the front is a right side of the upper swing body 3. A right-left direction of the upper swing body 3 is referred to as a width direction or an x-direction. In the hydraulic excavator 1 or the vehicle body 1B, a side of the traveling device 5 is a lower side with the upper swing body 3 as a reference, and a side of the upper swing body 3 is an upper side with the traveling device 5 as a reference. An up-down direction of the upper swing body 3 is a z-direction. In a case where the hydraulic excavator 1 is provided on a horizontal plane, the lower side is a vertical direction, that is, a gravity action direction side, and the upper side is opposite to the vertical direction.

The work equipment 2 has the boom 6, the arm 7, the bucket 8 that is a work tool, a boom cylinder 10, an arm cylinder 11, and a bucket cylinder 12. A proximal end portion of the boom 6 is rotationally movably attached to a front portion of the vehicle body 1B through a boom pin 13. A proximal end portion of the arm 7 is rotationally movably attached to a distal end portion of the boom 6 through an arm pin 14. The bucket 8 is attached to a distal end portion of the arm 7 through a bucket pin 15. The bucket 8 rotationally moves around the bucket pin 15. The bucket 8 has a plurality of blades 8B attached to a side opposite to the bucket pin 15. A tooth 8T is a distal end of the blade 8B.

The bucket 8 may not have a plurality of blades 8B. That is, the bucket 8 may be a bucket that does not have the blades 8B shown in FIG. 2 and has a tooth formed of a steel plate in a straight shape. The work equipment 2 may include, for example, a tilt bucket having a single blade. The tilt bucket is a bucket that includes a bucket tilt cylinder with which a bucket is laterally tilted, and thus, can freely shape or level a slope or a level ground even though the hydraulic excavator is on a slope ground and can perform rolling-compaction work with a bottom plate. In addition, the work equipment 2 may include a rock drilling attachment including a slope finishing bucket or a rock drilling tip, instead of the bucket 8, as a work tool.

Each of the boom cylinder 10, the arm cylinder 11, and the bucket cylinder 12 shown in FIG. 2 is a hydraulic cylinder that is driven by pressure of hydraulic fluid discharged from a hydraulic pump. The boom cylinder 10 drives the boom 6 to be rotationally moved. The arm cylinder 11 drives the arm 7 to be rotationally moved around the arm pin 14. The bucket cylinder 12 drives the bucket 8 to be rotationally moved around the bucket pin 15.

The antennas 21 and 22 and the antenna 24 are attached to an upper portion of the upper swing body 3. The antennas 21 and 22 are used to detect a current position of the hydraulic excavator 1. The antennas 21 and 22 are electrically connected to the global position calculation device 23 shown in FIG. 3. The global position calculation device 23 is a position detection device that detects a position of the hydraulic excavator 1. The global position calculation device 23 detects the current position of the hydraulic excavator 1 using Real Time Kinematic-Global Navigation Satellite Systems (RTK-GNSS). In the following description, the antennas 21 and 22 are appropriately referred to as GNSS antennas 21 and 22. Signals corresponding to GNSS radio waves received by the GNSS antennas 21 and 22 are input to the global position calculation device 23. The global position calculation device 23 obtains installation positions of the GNSS antennas 21 and 22 in a global coordinate system. An example of GNSS is a global positioning system (GPS), but GNSS is not limited thereto.

As shown in FIG. 2, it is preferable that the GNSS antennas 21 and 22 are provided both end positions separated in the right-left direction of the hydraulic excavator 1, that is, in the width direction on the upper swing body 3. In the embodiment, the GNSS antennas 21 and 22 are attached to the handrails 9 attached to both sides in the width direction of the upper swing body 3. The positions where the GNSS antennas 21 and 22 are attached to the upper swing body 3 are not limited to the handrails 9, and it is preferable that the GNSS antennas 21 and 22 are provided at positions separated as much as possible since the detection accuracy of the current position of the hydraulic excavator 1 is improved. It is preferable that the GNSS antennas 21 and 22 are provided at positions where a visual field of the operator is little obstructed.

Since the imaging device 19 images the work target WA shown in FIG. 1, and the distance detection device 20 obtains a distance between the distance detection device 20 (a predetermined position of the hydraulic excavator 1) and the work target WA, it is preferable to acquire information from the work target WA as wide as possible. For this reason, in the embodiment, the antenna 24, the imaging device 19, and the distance detection device 20 are provided above the cab 4 of the upper swing body 3. The places where the imaging device 19 and the distance detection device 20 are not limited to above the cab 4. For example, the imaging device 19 and the distance detection device 20 may be provided inside and above the cab 4.

The imaging device 19 has an imaging surface 19L facing the front of the upper swing body 3. The distance detection device 20 has a detection surface 20L facing the front of the upper swing body 3. In the embodiment, the imaging device 19 is a monocular camera including an image sensor, such as a charge coupled device (CCD) image sensor or a complementary metal oxide semiconductor (CMOS) image sensor.

In the embodiment, the distance detection device 20 is a three-dimensional laser range finder, a three-dimensional laser scanner, a three-dimensional distance sensor, or the like. The three-dimensional laser range finder or the like is also referred to as light detection and ranging (LiDAR) or the like, and is a sensor (scanning distance measurement sensor) that performs irradiation of laser beam emitting light in a pulse shape in a plurality of measurement directions over a given range while sequentially scanning the measurement directions, and measures a distance and an orientation based on a time until reflected scattered beam is returned and an irradiation direction. In the embodiment, the distance detection device 20 sequentially stores, updates, and outputs three-dimensional data (measurement data) indicating a measurement result of each measurement point (each reflection point) in every scanning cycle. The three-dimensional data output from the distance detection device 20 is point group data indicating a distance and an orientation to each measurement point or a three-dimensional coordinate value of each measurement point. LiDAR is exceptional in longer transmission distance and outdoor application. In another embodiment, although a portion corresponding to the work machine can be removed from two-dimensional scan data as measurement data, in the embodiment, a correction amount to three-dimensional scan data is obtained to apply to three-dimensional terrain data.

The three-dimensional laser range finder is not limited to an electronic distance meter of the pulsed system (propagation time detection system) described above and may be an electronic distance meter of an intensity modulation system (phase difference detection system).

<Control System of Hydraulic Excavator 1>

Figure 3:
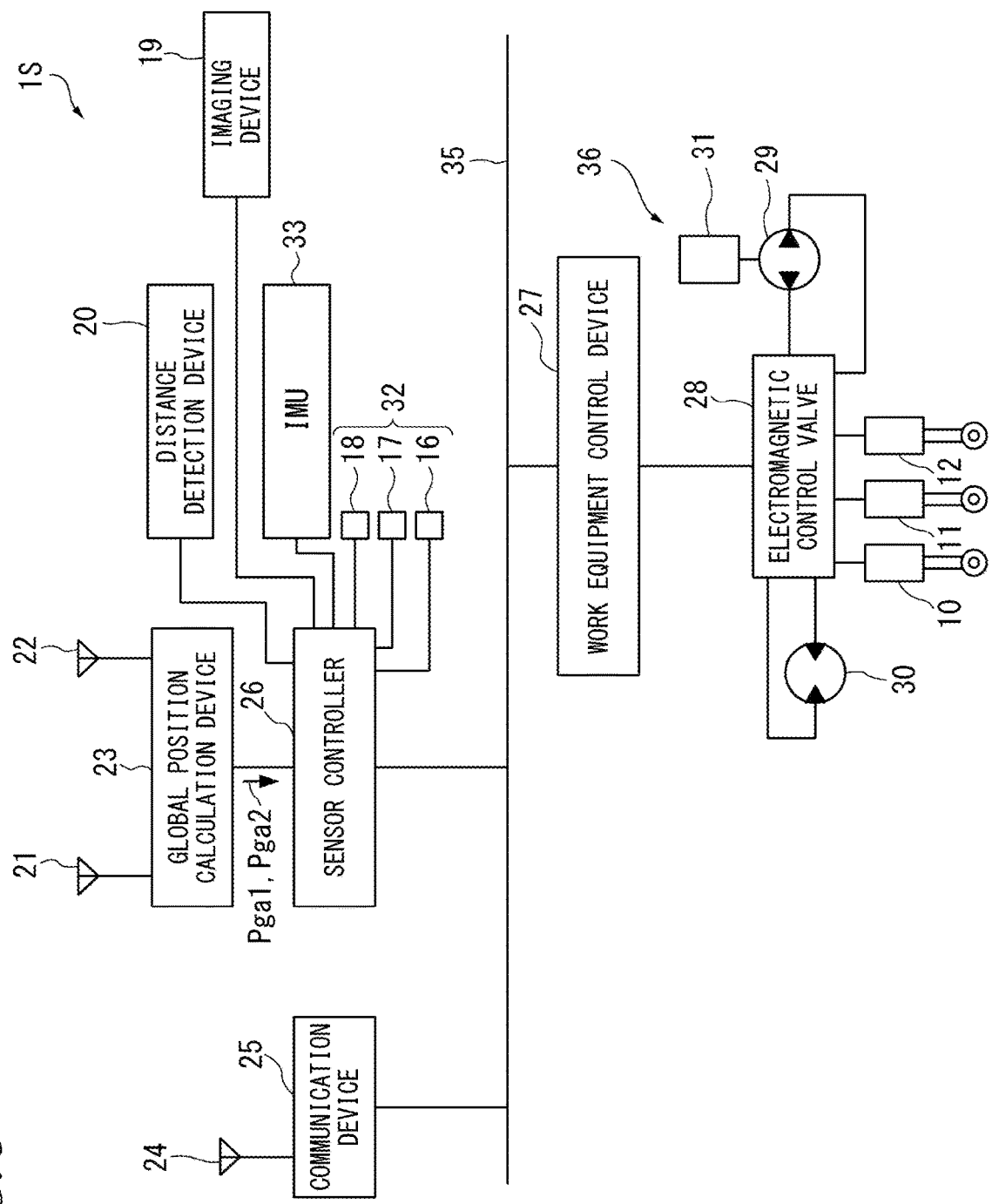
FIG. 3 is a diagram showing a control system of the hydraulic excavator that is the work machine according to the embodiment.

FIG. 3 is a diagram showing a control system 15 of the hydraulic excavator 1 that is the work machine according to the embodiment. The control system 15 includes the communication device 25, a sensor controller 26, the work equipment control device 27, the imaging device 19, the distance detection device 20, the global position calculation device 23, the posture detection device 32, an inertial measurement unit (IMU) 33, and a hydraulic system 36. The communication device 25, the sensor controller 26, and the work equipment control device 27 are connected by a signal line 35. With such a structure, the communication device 25, the sensor controller 26, and the work equipment control device 27 can exchange information through the signal line 35. Examples of the signal line that transfers information in the control system 1S include an in-vehicle signal line, such as a controller area network (CAN).

The sensor controller 26 has a processor, such as a central processing unit (CPU), and a storage device, such as a RAM and a ROM. A detection value of the global position calculation device 23, information regarding an image captured by the imaging device 19, a detection value of the distance detection device 20, a detection value of the posture detection device 32, and a detection value of the IMU 33 are input to the sensor controller 26. The sensor controller 26 transmits the input detection values and information regarding the image to the processing device 51 of the facility 50 shown in FIG. 1 through the signal line 35 and the communication device 25.

The work equipment control device 27 has a processor, such as a CPU, and a storage device, such as a random access memory (RAM) and a read only memory (ROM). The work equipment control device 27 acquires a command for operating at least one of the work equipment 2 and the upper swing body 3 generated by the processing device 51 of the facility 50 through the communication device 25. The work equipment control device 27 controls an electromagnetic control valve 28 of the hydraulic system 36 based on the acquired command.

The hydraulic system 36 includes the electromagnetic control valve 28, the hydraulic pump 29, and hydraulic actuators, such as the boom cylinder 10, the arm cylinder 11, the bucket cylinder 12, and a swing motor 30. The hydraulic pump 29 is driven by an engine 31 to discharge hydraulic fluid for operating the hydraulic actuators. The work equipment control device 27 controls a flow rate of the hydraulic fluid that is supplied to the boom cylinder 10, the arm cylinder 11, the bucket cylinder 12, and the swing motor 30, by controlling the electromagnetic control valve 28. In this manner, the work equipment control device 27 controls the operations of the boom cylinder 10, the arm cylinder 11, the bucket cylinder 12, and the swing motor 30.

The sensor controller 26 acquires detection values of a first stroke sensor 16, a second stroke sensor 17, and a third stroke sensor 18. The first stroke sensor 16 is provided in the boom cylinder 10, the second stroke sensor 17 is provided in the arm cylinder 11, and the third stroke sensor 18 is provided in the bucket cylinder 12.

The first stroke sensor 16 detects a boom cylinder length that is the length of the boom cylinder 10 and outputs the boom cylinder length to the sensor controller 26. The second stroke sensor 17 detects an arm cylinder length that is the length of the arm cylinder 11 and outputs the arm cylinder length to the sensor controller 26. The third stroke sensor 18 detects a bucket cylinder length that is the length of the bucket cylinder 12 and outputs the bucket cylinder length to the sensor controller 26.

In a case where the boom cylinder length, the arm cylinder length, and the bucket cylinder length are decided, the posture of the work equipment 2 is decided. Accordingly, the first stroke sensor 16, the second stroke sensor 17, and the third stroke sensor 18 that detect the boom cylinder length, the arm cylinder length, and the bucket cylinder length correspond to the posture detection device 32 that detects the posture of the work equipment 2. The posture detection device 32 is not limited to the first stroke sensor 16, the second stroke sensor 17, and the third stroke sensor 18, and may be an angle detector.

The sensor controller 26 calculates an inclination angle of the boom 6 with respect to a direction (z-axis direction) perpendicular to the horizontal plane in the local coordinate system that is the coordinate system of the hydraulic excavator 1, from the boom cylinder length detected by the first stroke sensor 16. The work equipment control device 27 calculates an inclination angle of the arm 7 with respect to the boom 6 from the arm cylinder length detected by the second stroke sensor 17. The work equipment control device 27 calculates an inclination angle of the bucket 8 with respect to the arm 7 from the bucket cylinder length detected by the third stroke sensor 18. The inclination angles of the boom 6, the arm 7, and the bucket 8 are information indicating the posture of the work equipment 2. That is, the sensor controller 26 obtains information indicating the posture of the work equipment 2. The sensor controller 26 transmits the calculated inclination angles to the processing device 51 of the facility 50 shown in FIG. 1 through the signal line 35 and the communication device 25.

The GNSS antenna 21 receives a position P1 indicating the position of the GNSS antenna 21 from the positioning satellites. The GNSS antenna 22 receives a position P2 indicating the position of the GNSS antenna 22 from the positioning satellites. The GNSS antennas 21 and 22 receive the positions P1 and P2 in a 10 Hz cycle, for example. The positions P1 and P2 are information regarding the positions that the GNSS antennas are provided, in the global coordinate system. Signals corresponding to GNSS radio waves received by the GNSS antennas 21 and 22, that is, the positions P1 and P2 are input to the global position calculation device 23. The GNSS antennas 21 and 22 output the positions P1 and P2 to the global position calculation device 23 each time the positions P1 and P2 are received.

The global position calculation device 23 has a processor, such as a CPU, and a storage device, such as a RAM and a ROM. The global position calculation device 23 detects the positions P1 and P2 of the GNSS antennas 21 and 22 in the global coordinate system at a frequency of, for example, 10 Hz and outputs the positions P1 and P2 as reference position information Pga1 and Pga2 to the sensor controller 26. In the embodiment, the global position calculation device 23 obtains a yaw angle that is an azimuth angle of the hydraulic excavator 1, and more specifically, an azimuth angle of the upper swing body 3, from the acquired two positions P1 and P2 and outputs the yaw angle to the sensor controller 26. The sensor controller 26 transmits the acquired reference position information Pga1 and Pga2 and the yaw angle to the processing device 51 of the facility 50 shown in FIG. 1 through the signal line 35 and the communication device 25.

The IMU 33 detects an operation and a posture of the hydraulic excavator 1. The operation of the hydraulic excavator 1 includes at least one of an operation of the upper swing body 3 and an operation of the traveling device 5. The posture of the hydraulic excavator 1 can be represented by a roll angle, a pitch angle, and the yaw angle of the hydraulic excavator 1. In the embodiment, the IMU 33 detects and outputs an angular velocity and an acceleration of the hydraulic excavator 1.

<Functional Configuration Example of Processing Unit 51P>

Figure 4:
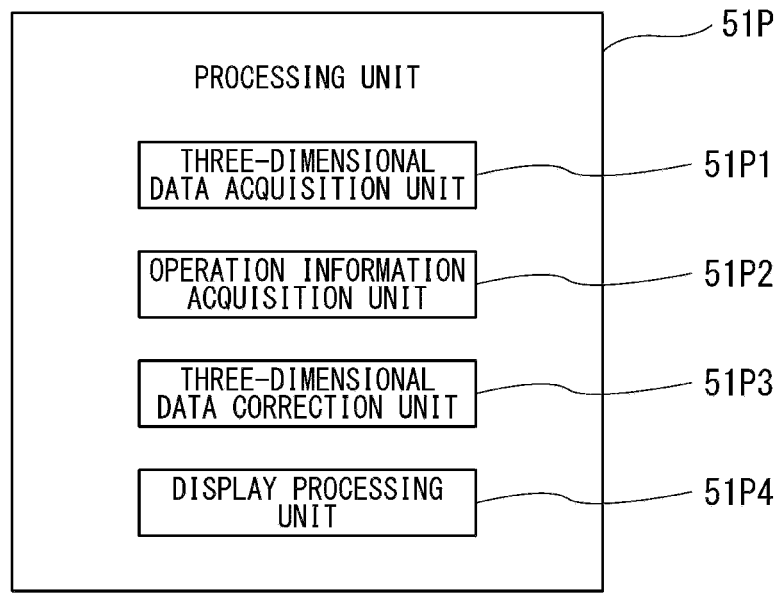
FIG. 4 is a block diagram showing a functional configuration example of a processing unit 51P shown in FIG. 1.

FIG. 4 is a block diagram showing a functional configuration example of the processing unit 51P shown in FIG. 1. As shown in FIG. 4, the processing unit 51P of the embodiment has, as functional elements configured with a combination of hardware and software, a three-dimensional data acquisition unit 51P1 (measurement data acquisition unit), an operation information acquisition unit 51P2, a three-dimensional data correction unit 51P3 (measurement data correction unit), and a display processing unit 51P4. The three-dimensional data acquisition unit 51P1 acquires three-dimensional data from the distance detection device 20 (scanning distance measurement sensor) that updates three-dimensional data measured, for example, in a predetermined cycle, through the sensor controller 26 and the like. The operation information acquisition unit 51P2 acquires operation information representing the operation of the hydraulic excavator 1 (work machine) occurring in a cycle of update of the three-dimensional data by the distance detection device 20, through the sensor controller 26 and the like. Here, the operation information includes information indicating the position of the hydraulic excavator 1 and the posture of the work equipment 2. The three-dimensional data correction unit 51P3 removes a portion corresponding to the hydraulic excavator 1 (work equipment 2 and the like) in the three-dimensional data based on the operation information. Then, the display processing unit 51P4 displays, on the display device 52, an image in which an image based on three-dimensional data with a portion removed is superimposed on an image captured by the imaging device 19 (camera). According to this configuration, since the portion corresponding to the hydraulic excavator 1 in the three-dimensional data is removed based on the operation information representing the operation of the hydraulic excavator 1 occurring in the cycle of the update of the three-dimensional data by the distance detection device 20, it is possible to remove part of the three-dimensional data to correspond to all changes of the operation of the hydraulic excavator 1 occurring in the cycle of the update. Accordingly, even in a case where the scanning distance measurement sensor that detects a distance while sequentially scanning a plurality of measurement points is used as the distance detection device 20, even though the position or the posture of the bucket 8 or the work equipment 2 of the hydraulic excavator 1 is changed in an update period, such as the scanning period of the distance detection device 20, it is possible to easily suppress an error in determination of matching. An aspect may be made in which the processing unit 51P has the three-dimensional data acquisition unit 51P1, the operation information acquisition unit 51P2, and the three-dimensional data correction unit 51P3 without having the display processing unit 51P4 and executes processing of removing a portion corresponding to the hydraulic excavator 1 (work equipment 2 and the like) in the three-dimensional data to generate a three-dimensional map.

The operation information can be a work equipment model to which interpolation angle information for interpolating angle information of the work equipment 2 of the hydraulic excavator 1 acquired at a scanning start time of the distance detection device 20 and angle information of the work equipment 2 acquired at a scanning end time is applied. The three-dimensional data correction unit 51P3 can remove the portion corresponding to the hydraulic excavator 1 based on the operation information with a position of an end portion (for example, tooth) of the bucket 8 (work tool) of the hydraulic excavator 1 in the cycle of the update in the three-dimensional data as a reference. These points will be described below.

<Coordinate System>

Figure 5:
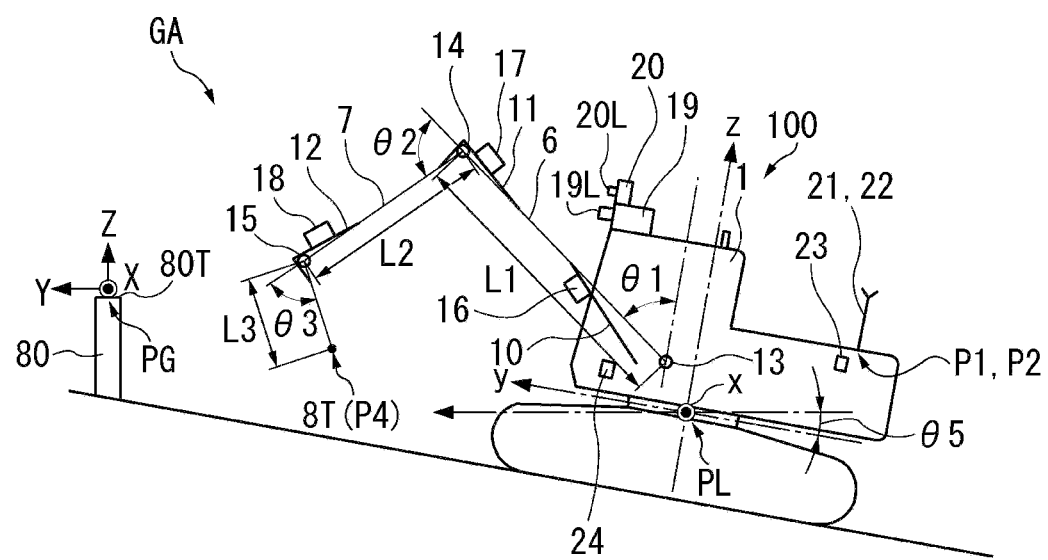
FIG. 5 is a diagram showing a coordinate system in the image display system and the remote operation system according to the embodiment.
Figure 6:
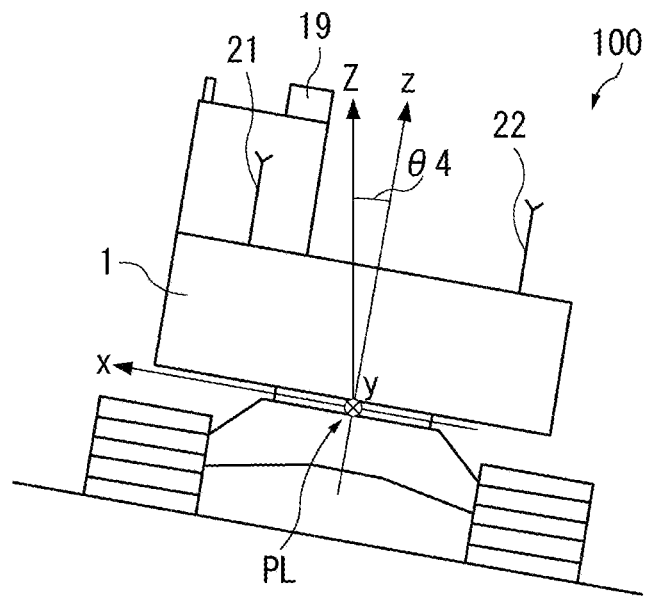
FIG. 6 is a rear view of the hydraulic excavator.
Figure 7:
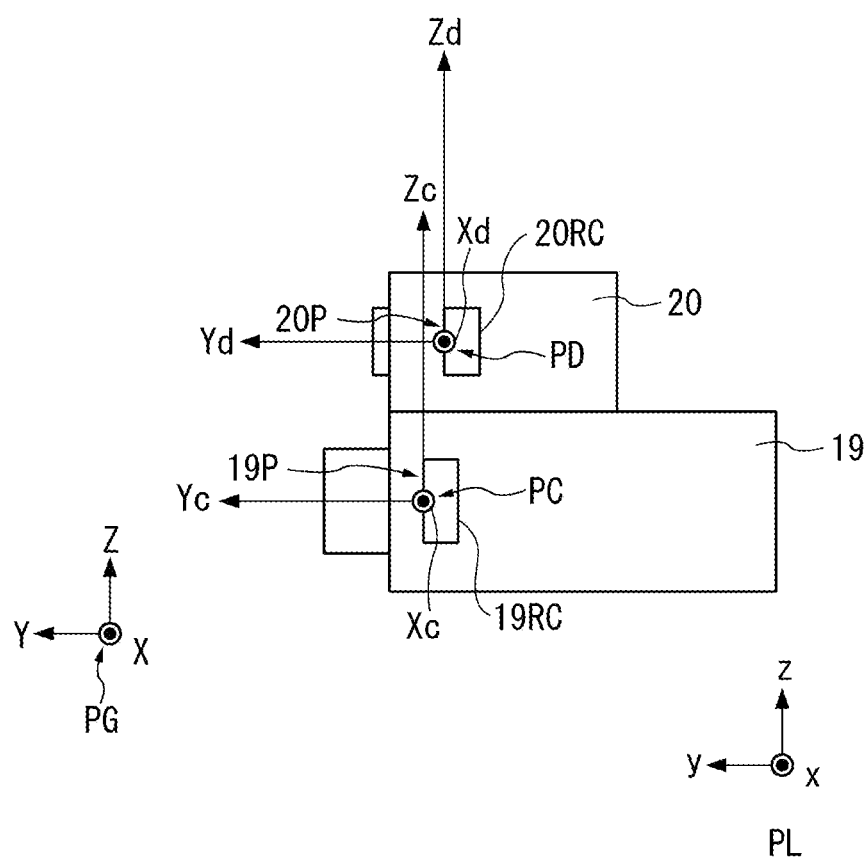
FIG. 7 is a diagram showing a coordinate system of an imaging device and a distance detection device.

FIG. 5 is a diagram showing a coordinate system in the image display system 100 and the remote operation system 101 according to the embodiment. FIG. 6 is a rear view of the hydraulic excavator 1. FIG. 7 is a diagram showing a coordinate system of the imaging device and the distance detection device. In the image display system 100 and the remote operation system 101, there are a global coordinate system, a local coordinate system, a coordinate system of the imaging device 19, and a coordinate system of the distance detection device 20. In the embodiment, the global coordinate system is, for example, a coordinate system in GNSS. The global coordinate system is a three-dimensional coordinate system indicated by (X, Y, Z) with, for example, a reference position PG of a reference pile 80 to be a reference provided in a work section GA of the hydraulic excavator 1 as a reference. As shown in FIG. 5, the reference position PG is positioned, for example, at a distal end 80T of the reference pile 80 provided in the work section GA.

The local coordinate system is a three-dimensional coordinate system indicated by (x, y, z) with the hydraulic excavator 1 as a reference. In the embodiment, an origin position PL of the local coordinate system is an intersection between the z-axis that is a rotation center axis of the upper swing body 3 and a plane perpendicular to the z-axis within a swing circle of the upper swing body 3 but is not limited thereto. The plane perpendicular to the z-axis within the swing circle can be a plane passing through the center of the swing circle in the z-axis direction.

In the embodiment, as shown in FIG. 7, the coordinate system of the imaging device 19 is a three-dimensional coordinate system indicated by (Xc, Yc, Zc) with the center of a light receiving surface 19P of an imaging element 19RC as an origin PC. In the embodiment, as shown in FIG. 7, the coordinate system of the distance detection device 20 is a three-dimensional coordinate system indicated by (Xd, Yd, Zd) with the center of a light receiving surface 20P of a distance detection element 20RC as an origin PD.

<Posture of Hydraulic Excavator 1>

As shown in FIG. 6, an inclination angle θ4 of the upper swing body 3 with respect to the right-left direction, that is, the width direction is the roll angle of the hydraulic excavator 1, as shown in FIG. 5, an inclination angle θ5 of the upper swing body 3 in the front-rear direction is the pitch angle of the hydraulic excavator 1, and an angle of the upper swing body 3 around the z-axis is the yaw angle of the hydraulic excavator 1. The roll angle is obtained by integrating an angular velocity around the y-axis detected by the IMU 33 with a time, the pitch angle is obtained by integrating an angular velocity around the x-axis detected by the IMU 33 with a time, and the yaw angle is obtained by integrating an angular velocity around the z-axis detected by the IMU 33 with a time. The angular velocity around the z-axis is a swing angular velocity ω of the hydraulic excavator 1. That is, the yaw angle of the hydraulic excavator 1, and more specifically, the upper swing body 3 is obtained by integrating the swing angular velocity ω with a time.

The acceleration and the angular velocity detected by the IMU 33 are output as operation information to the sensor controller 26. The sensor controller 26 executes processing, such as filter processing and integration, on the operation information acquired from the IMU 33 to obtain the inclination angle θ4 as the roll angle, the inclination angle θ5 as the pitch angle, and the yaw angle. The sensor controller 26 transmits the obtained inclination angle θ4, the inclination angle θ5, and the yaw angle as information related to the posture of the hydraulic excavator 1 to the processing device 51 of the facility 50 shown in FIG. 1 through the signal line 35 and the communication device 25 shown in FIG. 3.

As described above, the sensor controller 26 obtains information indicating the posture of the work equipment 2. Specifically, information indicating the posture of the work equipment 2 is an inclination angle θ1 of the boom 6 with respect to a direction (z-axis direction) perpendicular to the horizontal plane in the local coordinate system, an inclination angle θ2 of the arm 7 with respect to the boom 6, and an inclination angle θ3 of the bucket 8 with respect to the arm 7. The processing device 51 of the facility 50 shown in FIG. 1 calculates a position (hereinafter, appropriately referred to as a tooth position) P4 of the tooth 8T of the bucket 8 from information indicating the posture of the work equipment 2 acquired from the sensor controller 26 of the hydraulic excavator 1, that is, the inclination angles θ1, θ2, and θ3.

The storage unit 51M of the processing device 51 stores data (hereinafter, appropriately referred to as work equipment data) of the work equipment 2. The work equipment data includes a length L1 of the boom 6, a length L2 of the arm 7, and a length L3 of the bucket 8. As shown in FIG. 5, the length L1 of the boom 6 corresponds to a length from the boom pin 13 to the arm pin 14. The length L2 of the arm 7 corresponds to a length from the arm pin 14 to the bucket pin 15. The length L3 of the bucket 8 corresponds to a length from the bucket pin 15 to the tooth 8T of the bucket 8. The tooth 8T is a distal end of the blade 8B shown in FIG. 2. The work equipment data includes information regarding a position of the boom pin 13 with respect to the origin position PL of the local coordinate system. The processing device 51 can obtain the tooth position P4 with respect to the origin position PL using the lengths L1, L2, and L3, the inclination angles θ1, θ2, and θ3, and the origin position PL. In the embodiment, although the processing device 51 of the facility 50 obtains the tooth position P4, the sensor controller 26 of the hydraulic excavator 1 may obtain the tooth position P4 and may transmit the tooth position P4 to the processing device 51 of the facility 50.

<Control Example that is Executed by the Image Display System 100 and the Remote Operation System 101>

Figure 8:
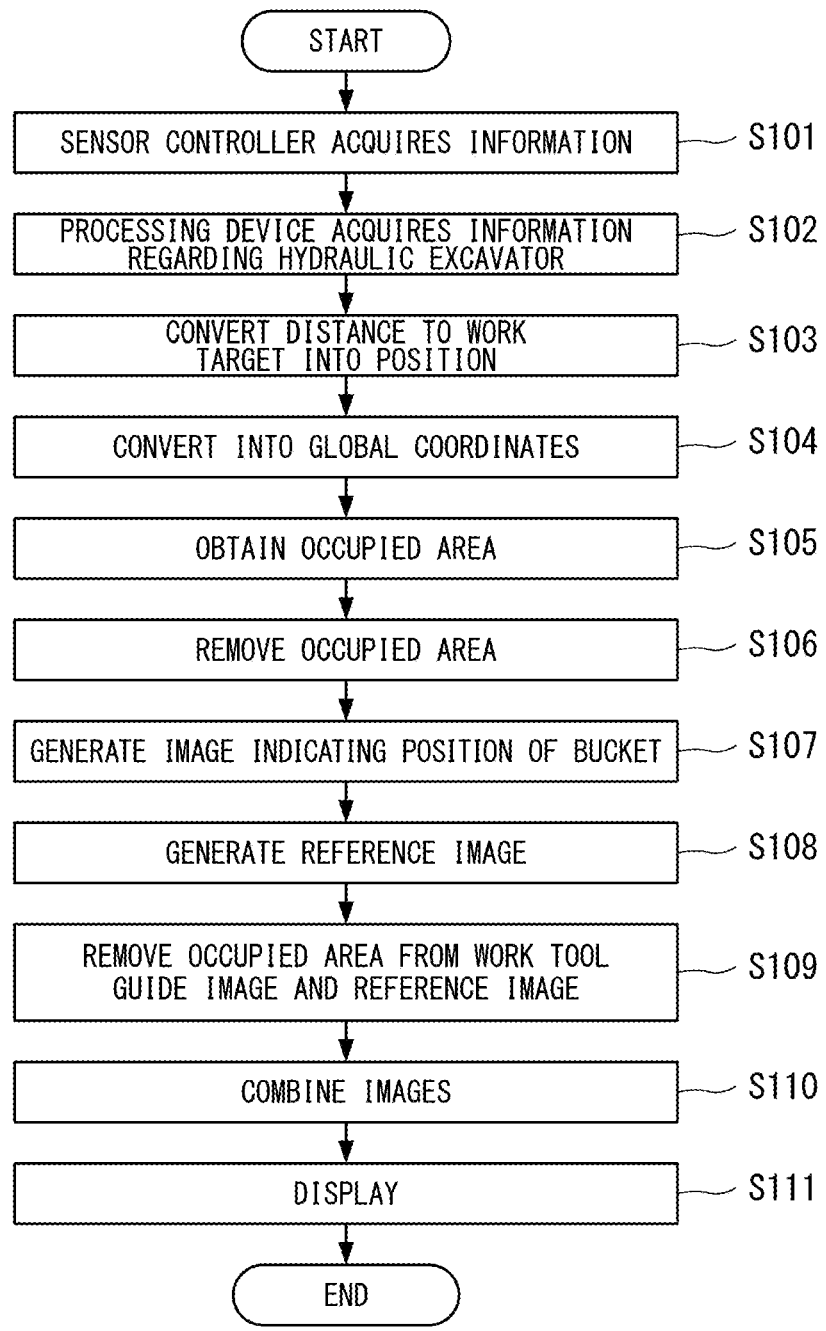
FIG. 8 is a flowchart of a control example that is executed by the image display system and the remote operation system.
Figure 14:
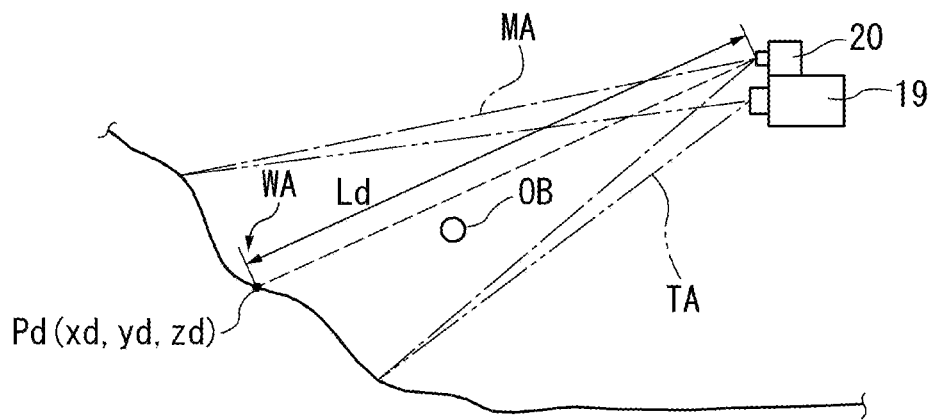
FIG. 14 is a diagram showing the imaging device, the distance detection device, and a work target.

FIG. 8 is a flowchart of a control example that is executed by the image display system 100 and the remote operation system 101. FIG. 14 is a diagram showing the imaging device 19, the distance detection device 20, and the work target WA.

In Step S101, the sensor controller 26 shown in FIG. 3 acquires information regarding the hydraulic excavator 1. Information of the hydraulic excavator 1 is information obtained from the imaging device 19, the distance detection device 20, the global position calculation device 23, the posture detection device 32, and the IMU 33. As shown in FIG. 14, the imaging device 19 images the work target WA within an imaging range TA and obtains an image of the work target WA. The distance detection device 20 detects a distance Ld between the distance detection device 20 and the work target WA and other objects within a detection range MA. The global position calculation device 23 obtains the reference position information Pga1 and Pga2 corresponding to the positions P1 and P2 of the GNSS antennas 21 and 22 in the global coordinate system. The posture detection device 32 detects the boom cylinder length, the arm cylinder length, and the bucket cylinder length. The IMU 33 detects the posture of the hydraulic excavator 1, and more specifically, the roll angle θ4, the pitch angle θ5, and the yaw angle of the upper swing body 3.

In Step S102, the image display system 100 and the processing device 51 of the remote operation system 101 acquires information regarding the hydraulic excavator 1 from the sensor controller 26 of the hydraulic excavator 1 through the communication device 25 of the hydraulic excavator 1 and the communication device 54 connected to the processing device 51 with the three-dimensional data acquisition unit 51P1 or the operation information acquisition unit 51P2.

Information of the hydraulic excavator 1 that is acquired from the sensor controller 26 by the processing device 51 includes the image of the work target WA captured by the imaging device 19, information regarding the distance between the distance detection device 20 and the work target WA detected by the distance detection device 20, information regarding the posture of the work equipment 2 of the hydraulic excavator 1 detected by the posture detection device 32, the reference position information Pga1 and Pga2, and information regarding the posture of the hydraulic excavator 1.

Information regarding the distance between the distance detection device 20 and the work target WA includes a distance Ld to the work target WA or an object OB within the detection range MA and information regarding an azimuth direction of a position Pd corresponding to the distance Ld. FIG. 14 shows the distance Ld as the distance to the work target WA. Information regarding the azimuth direction of the position Pd is an azimuth direction of the position Pd with the distance detection device 20 as a reference, and angles with respect to the axes Xd, Yd, and Zd of the coordinate system of the distance detection device 20. Information regarding the posture of the work equipment 2 that is acquired by the processing device 51 is the inclination angles θ1, θ2, and θ3 of the work equipment 2 that are obtained by the sensor controller 26 using the boom cylinder length, the arm cylinder length, and the bucket cylinder length. Information regarding the posture of the hydraulic excavator 1 is the roll angle θ4, the pitch angle θ5, and the yaw angle of the hydraulic excavator 1, and more specifically, the upper swing body 3.

The processing device 51 obtains the tooth position P4 of the bucket 8 using the inclination angles θ1, θ2, and θ3 of the work equipment 2 acquired from the sensor controller 26 and the length L1 of the boom 6, the length L2 of the arm 7, and the length L3 of the bucket 8 stored in the storage unit 51M, with three-dimensional data correction unit 51P3 (or the display processing unit 51P4) (hereinafter, the same applies), for example. The tooth position P4 of the bucket 8 is a set of coordinates in the local coordinate system (x, y, z) of the hydraulic excavator 1.

The process progresses to Step S103, and the processing device 51 converts the distance Ld to the work target WA into information regarding a position using information regarding the distance to the work target WA, with the three-dimensional data correction unit 51P3. Information regarding the position is the coordinates of the position Pd in the coordinate system (Xd, Yd, Zd) of the distance detection device 20. In Step S103, all distances Ld detected by the distance detection device 20 within the detection range MA are converted into information regarding the position. The processing device 51 converts the distance Ld into information regarding the position using the distance Ld and information regarding the azimuth direction of the position Pd corresponding to the distance Ld, with the three-dimensional data correction unit 51P3. In Step S103, the distance to the object OB within the detection range MA is also converted into information regarding the position similarly to the distance Ld of the work target WA. Through the processing of Step S103, information regarding the position of the work target WA within the detection range MA is obtained. It is possible to obtain information regarding a shape of the work target WA from information regarding the position of the work target WA.

Information regarding the position and the shape of the work target WA is a set of coordinates of the position Pd in the coordinate system (Xd, Yd, Zd) of the distance detection device 20. The processing device 51 converts information regarding the shape of the work target WA into a value of the coordinate system (Xc, Yc, Zc) of the imaging device 19, and then converts the converted value into a value of the local coordinate system (x, y, z) of the hydraulic excavator 1, with the three-dimensional data correction unit 51P3.

In Step S104, the processing device 51 converts information regarding the position of the work target WA, the tooth position P4 of the bucket 8, and the reference position information Pga1 and Pga2 acquired from the sensor controller 26 of the hydraulic excavator 1 into the global coordinate system (X, Y, Z), with the three-dimensional data correction unit 51P3. In the conversion into the global coordinate system (X, Y, Z), the processing device 51 generates a rotation matrix using the roll angle θ4, the pitch angle θ5, and the yaw angle of the hydraulic excavator 1 acquired from the sensor controller 26, with the three-dimensional data correction unit 51P3. The processing device 51 converts information regarding the position of the work target WA, the tooth position P4 of the bucket 8, and the reference position information Pga1 and Pga2 into the global coordinate system (X, Y, Z) using the generated rotation matrix, with the three-dimensional data correction unit 51P3. Next, the process progresses to Step S105, and the processing device 51 obtains an occupied area with the three-dimensional data correction unit 51P3.

Figure 15:
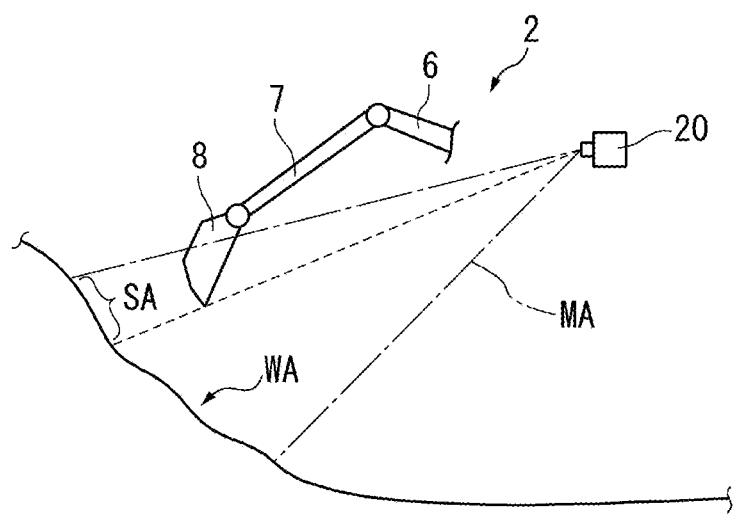
FIG. 15 is a diagram showing an occupied area.

FIG. 15 is a diagram showing an occupied area SA. The occupied area SA is an area occupied by the work equipment 2 within information regarding the shape of the work target WA. In an example shown in FIG. 15, part of the bucket 8 of the work equipment 2 enters within the detection range MA of the distance detection device 20 and between the distance detection device 20 and the work target WA. For this reason, in the portion of the occupied area SA, the distance detection device 20 detects the distance to the bucket 8, instead of the distance to the work target WA. In the embodiment, the processing device 51 removes the portion of the occupied area SA from information regarding the shape of the work target WA obtained in Step S103, with the three-dimensional data correction unit 51P3.

The processing device 51 stores information regarding at least one of the position and the posture detected by the distance detection device 20 corresponding to at least one of a position and a posture of the bucket 8 in, for example, the storage unit 51M, with the three-dimensional data correction unit 51P3. Such information is included in the posture of the work equipment 2 of the hydraulic excavator 1 in the embodiment. The posture of the work equipment 2 can be obtained using the inclination angles θ1, θ2, and θ3 of the work equipment 2, the length L1 of the boom 6, the length L2 of the arm 7, the length L3 of the bucket 8, and the posture of the hydraulic excavator 1 as needed. Then, the processing device 51 compares data detected by the distance detection device 20 with information stored in the storage unit 51M and can determine that the bucket 8 is detected in a case where both match, with the three-dimensional data correction unit 51P3. Through such processing using the posture of the work equipment 2, since the processing device 51 does not use information regarding the bucket 8 in the occupied area SA in generating the lattice image 65 shown in FIG. 1, the processing device 51 can accurately generate the lattice image 65.

Figure 9:
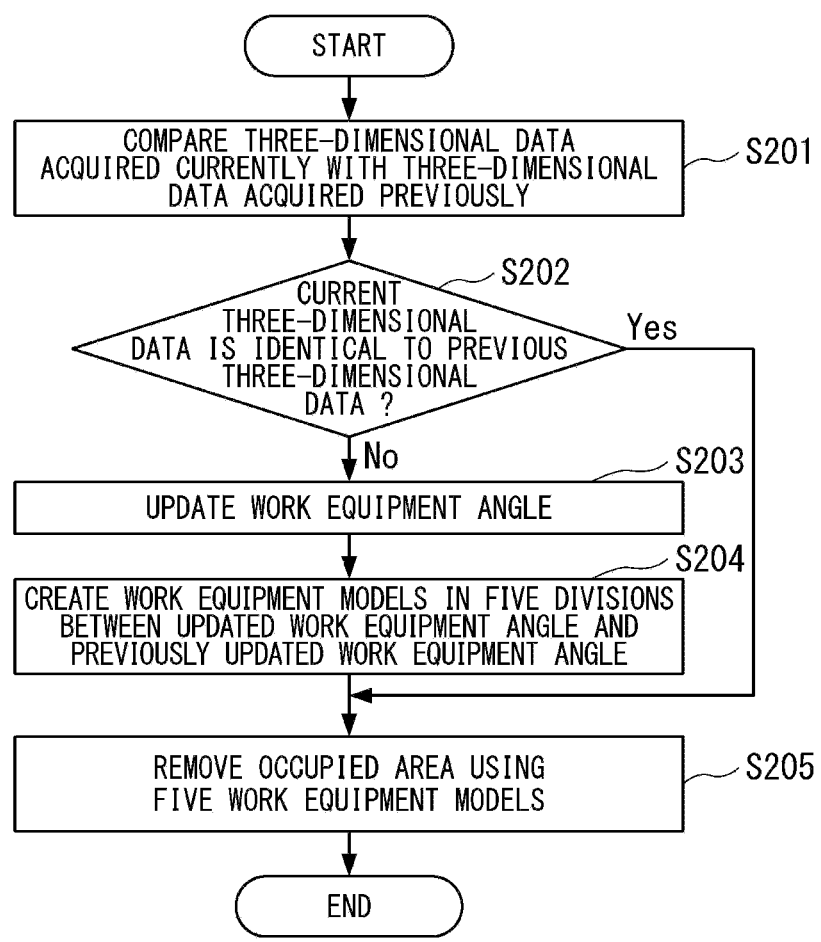
FIG. 9 is a flowchart showing an example of processing of Step S105 of FIG. 8.

Here, the processing of Step S105 will be described referring to FIGS. 9 to 13. FIG. 9 is a flowchart showing an example of the processing of Step S105 of FIG. 8. FIGS. 10 to 13 are diagrams showing the processing shown in FIG. 9.

Figure 10:
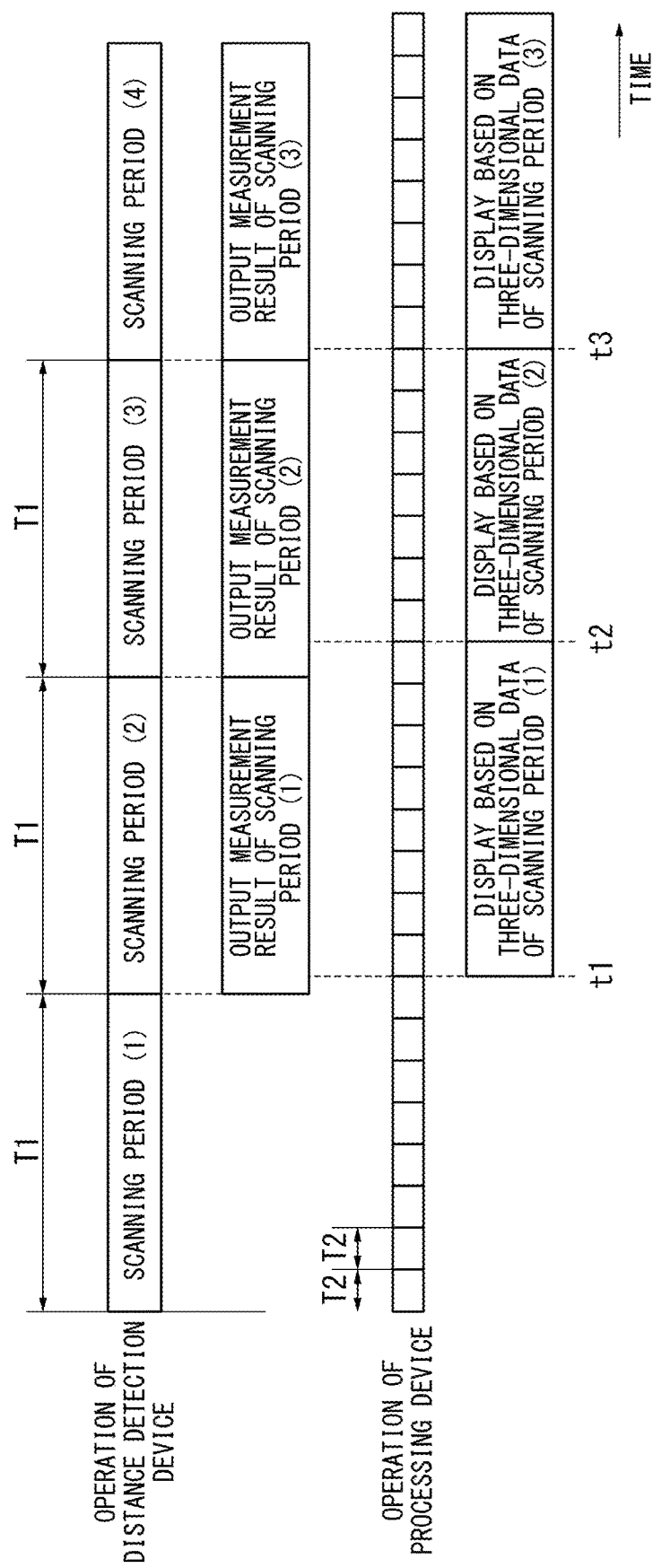
FIG. 10 is a diagram showing the processing shown in FIG. 9.

First, the outline of the processing of Step S105 will be described referring to FIGS. 10 and 13, and thereafter, the example of the processing of Step S105 of FIG. 8 will be described referring to the flowchart shown in FIG. 9.

A correspondence relationship between an operation of the distance detection device 20 and an operation of the processing device 51 will be described referring to FIG. 10. FIG. 10 shows a correspondence relationship between an operation of the distance detection device 20 and an operation of the processing device 51. In an example shown in FIG. 10, a scanning cycle of a distance measurement operation of the distance detection device 20 is a time T1, and a display cycle (an execution cycle of the processing shown in FIG. 8) of a combined image by the processing device 51 is a time T2. The distance detection device 20 outputs three-dimensional data based on a measurement result in a scanning period (1) after scanning in the scanning period (1) ends. The distance detection device 20 outputs three-dimensional data based on a measurement result in a scanning period (2) after scanning in the scanning period (2) ends. The distance detection device 20 outputs three-dimensional data based on a measurement result in a scanning period (3) after scanning in the scanning period (3) ends.

On the other hand, the processing device 51 reflects the measurement result in the scanning period (1) in three-dimensional data for use in display at a time t1, reflects the measurement result in the scanning period (2) in three-dimensional data for use in display at a time t2, and then, reflects the measurement result in the scanning period (3) in three-dimensional data for use in display at a time t3. In this case, the processing device 51 performs display based on the three-dimensional data in the scanning period (1) from the time t1 to the time t2, performs display based on the three-dimensional data in the scanning period (2) from the time t2 to the time t3, and then, performs display based on the three-dimensional data in the scanning period (3) after the time t3.

Figure 11:
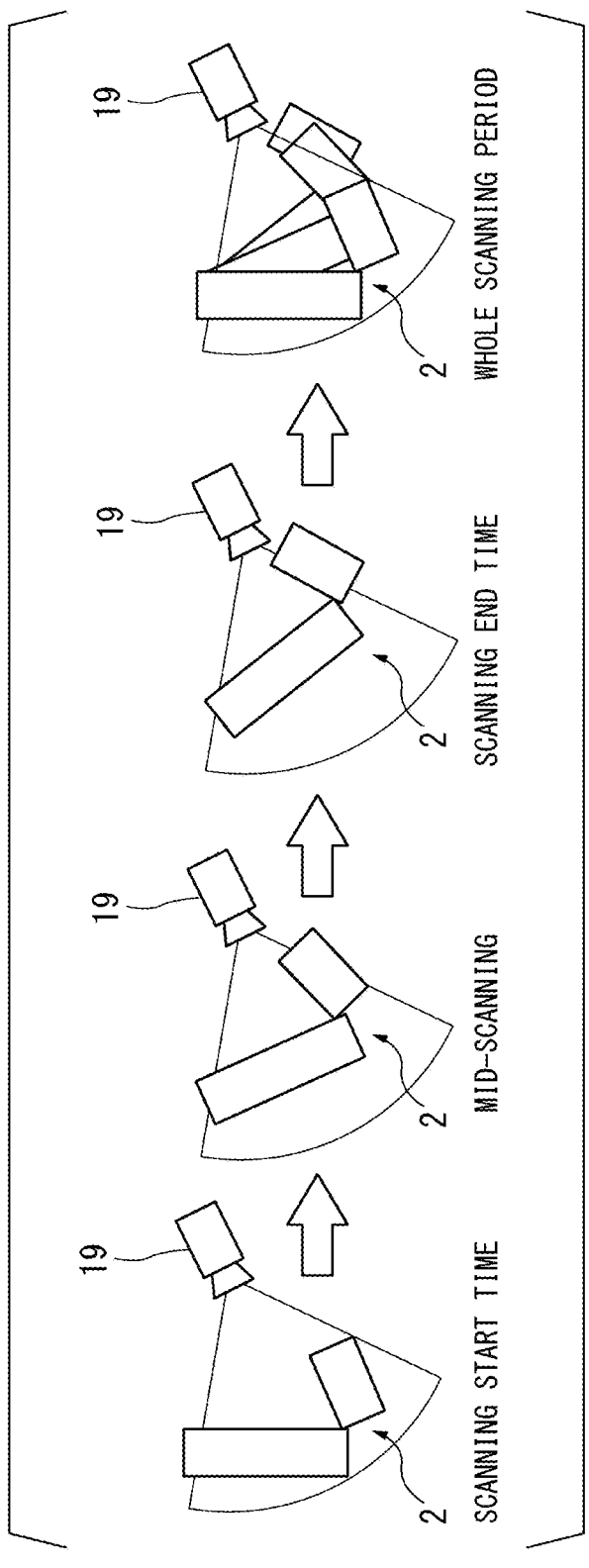
FIG. 11 is a diagram showing the processing shown in FIG. 9.

As shown in FIG. 11, in a case where the posture of the work equipment 2 is changed in one scanning period from the scanning start time to the scanning end time of the distance detection device 20 through a step of mid-scanning, and for example, in a case where the occupied area SA is determined based on the posture of the work equipment 2 at the scanning end time, there is a possibility that a large error is included in matching determination of the three-dimensional data at the scanning start time, for example.

Figure 12:
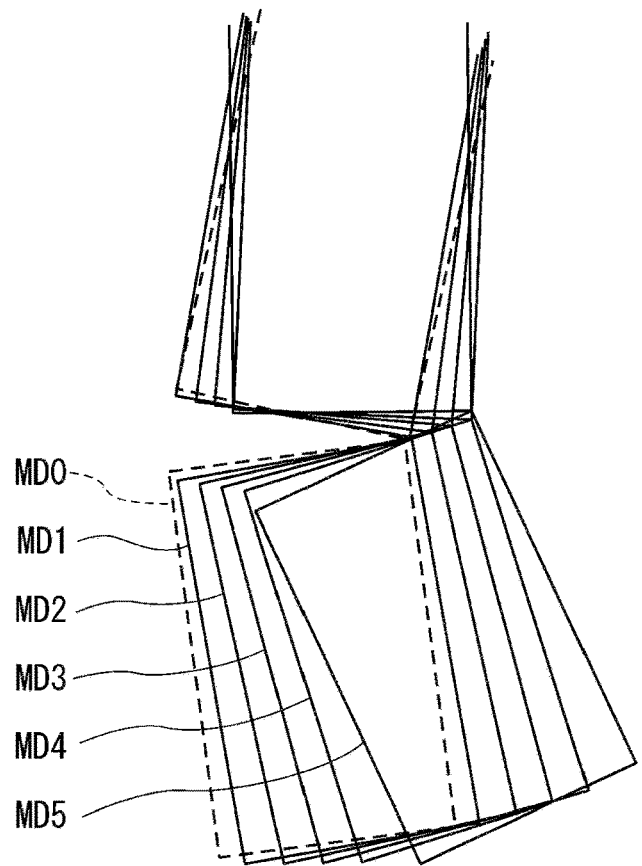
FIG. 12 is a diagram showing the processing shown in FIG. 9.

Accordingly, the three-dimensional data correction unit 51P3 of the embodiment removes a portion corresponding to the work machine in the three-dimensional data using the work equipment model to which the interpolation angle information for interpolating between the angle information of the work equipment 2 of the hydraulic excavator 1 acquired at the scanning start time of the distance detection device 20 and the angle information of the work equipment 2 acquired at the scanning end time is applied. The work equipment model is a three-dimensional design model of the work equipment 2 created based on posture information of the work equipment 2. The angle information of the work equipment 2 can be, for example, any of the inclination angle θ1, θ2, or θ3 of the work equipment 2. For example, as shown in FIG. 12, the three-dimensional data correction unit 51P3 creates work equipment models MD1, MD2, MD3, MD4, and MD5 based on three-dimensional design data of the work equipment 2 and the posture information of the work equipment 2. In this case, the work equipment model MD0 is a model corresponding to the scanning start time, and the work equipment model MD5 is a model corresponding to the scanning end time. The work equipment models MD1, MD2, MD3, and MD4 are work equipment models corresponding to four work equipment angles in a case where an amount of change of the work equipment angle is divided into five parts.

In a case where the work equipment angle at the time of scanning start (at the time of measurement start) is θt−1, and the work equipment angle at the time of scanning end (at the time of measurement end) is θt, the amount AO of change of the work equipment angle is $\Delta\theta=(\theta t)-(\theta t-1)$. In this case, the work equipment model MD1 is created as a work equipment model corresponding to a work equipment angle $(\theta t)-\Delta\theta \times 4/5$. The work equipment model MD2 is created as a work equipment model corresponding to a work equipment angle $(\theta t)-\Delta\theta \times 3/5$. The work equipment model MD3 is created as a work equipment model corresponding to a work equipment angle $(\theta t)-\Delta\theta \times 2/5$. The work equipment model MD4 is created as a work equipment model corresponding to a work equipment angle $(\theta t)-\Delta\theta \times 1/5$. Then, the work equipment model MD5 is created as a work equipment model corresponding to a work equipment angle $(\theta t)$.

In a case where the number of measurement points in one scanning period is N, the three-dimensional data correction unit 51P3 applies to the work equipment model MD1 to first to (1×N/5)th measurement points to perform matching determination (collision determination). The three-dimensional data correction unit 51P3 applies the work equipment model MD2 to ((1×N/5)+1)th to (2×N/5)th measurement points to perform matching determination. The three-dimensional data correction unit 51P3 applies the work equipment model MD3 to ((2×N/5)+1)th to (3×N/5)th measurement points to perform matching determination. The three-dimensional data correction unit 51P3 applies the work equipment model MD4 to ((3×N/5)+1)th to (4×N/5)th measurement points to perform matching determination. The three-dimensional data correction unit 51P3 applies the work equipment model MD5 to ((4×N/5)+1)th to N-th measurement points to perform matching determination.

Figure 13:
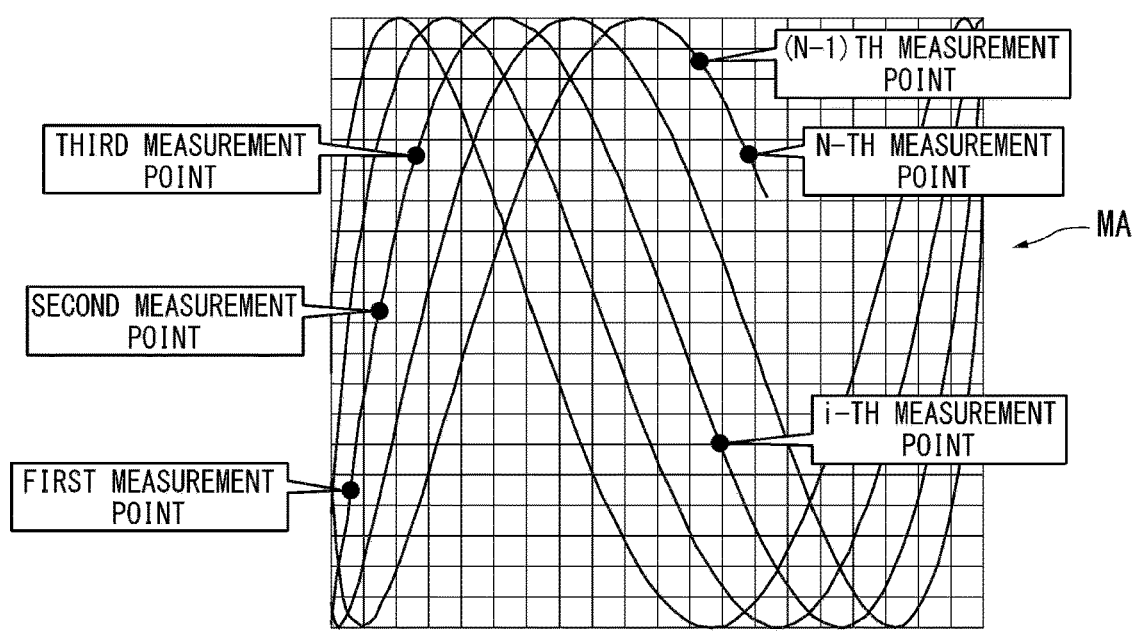
FIG. 13 is a diagram showing the processing shown in FIG. 9.

The distance detection device 20 performs measurement within the detection range MA through Lissajous scanning, for example, as shown in FIG. 13. FIG. 13 schematically shows a correspondence relationship between the detection range MA and each measurement point.

Next, the example of the processing of Step S105 of FIG. 8 will be described referring to FIG. 9. In Step S105 of FIG. 8, the three-dimensional data correction unit 51P3 first compares three-dimensional data acquired currently with three-dimensional data acquired previously (Step S201). In a case where the three-dimensional data acquired currently acquired is not identical to the three-dimensional data acquired previously (in Step S202, "No"), the three-dimensional data correction unit 51P3 updates the work equipment angle (Step S203), creates the work equipment models in five divisions between the updated work equipment angle and the work equipment angle updated previously (Step S204), removes three-dimensional data corresponding to the occupied area SA using the created five work equipment models (Step S205), and ends the processing shown in FIG. 9.

On the other hand, in a case where the three-dimensional data acquired currently is identical to the three-dimensional data acquired previously (in Step S202, "Yes"), the three-dimensional data correction unit 51P3 removes the three-dimensional data corresponding to the occupied area SA using the five work equipment models already created (Step S205), and ends the processing shown in FIG. 9.

In Step S205, the three-dimensional data correction unit 51P3 determines whether or not three-dimensional data is within the occupied area SA by determining whether or not the three-dimensional data is positioned within any of the work equipment models MD1 to MD5, using any of the five work equipment models MD1 to MD5 to the N measurement points.

The number of work equipment models is not limited to five and can be increased or decreased. One or a plurality of work equipment models in which a plurality of work equipment models is integrated may be created and compared with three-dimensional data. The three-dimensional data correction unit 51P3 may determine that, with the position of the work equipment 2 (for example, the end portion, such as the tooth of the work tool) of the work machine in the cycle of the update in the three-dimensional data as a reference (threshold value), all pieces of three-dimensional data that higher than the reference or at a high or low (long or short) distance from the work target are positioned within the occupied area SA and may remove the three-dimensional data. The threshold value can be set to a reference value of a maximum value or a minimum value depending on the form of the work equipment or the work tool. In this case, for example, the three-dimensional data correction unit 51P3 can interpolate the position of the tooth between the previous work equipment angle and the current work equipment angle to specify the position of the lowest tooth among the teeth and can remove all pieces of three-dimensional data (point group data) plotted at positions higher than the position of the tooth.

To remove the portion of the occupied area SA, the processing using the posture of the work equipment 2 may be executed by the following method. Information regarding at least one of the position and the posture of the bucket 8 in the global coordinate system included in the posture of the work equipment 2 is obtained from the inclination angles θ1, θ2, and θ3 of the work equipment 2, the length L1 of the boom 6, the length L2 of the arm 7, and the length L3 of the bucket 8. In Steps S103 and S104, information regarding the shape of the work target WA in the global coordinate system is obtained. In Step S106, the processing device 51 removes an area where the position of the bucket 8 is projected onto information regarding the shape of the work target WA, as the occupied area SA from the shape of the work target WA with the three-dimensional data correction unit 51P3.

Figure 16:
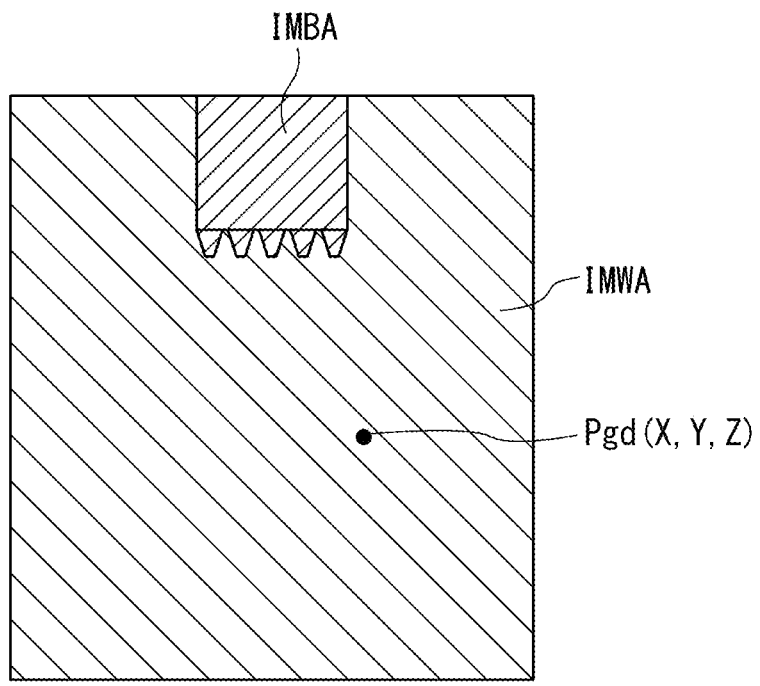
FIG. 16 is a diagram showing information regarding a shape of the work target with an occupied area removed.

FIG. 16 is a diagram showing information regarding the shape of the work target WA with the occupied area removed. Information IMWA regarding the shape of the work target WA is a set of coordinates Pgd (X, Y, Z) in the global coordinate system (X, Y, Z). There is no information of coordinates of the occupied area IMBA through the processing of Step S106. Next, the process progresses to Step S107, and the processing device 51 generates an image indicating the position of the bucket 8 with the display processing unit 51P4. The image indicating the position of the bucket 8 is an image of a portion corresponding to the bucket 8 on the work target WA.

Figure 17:
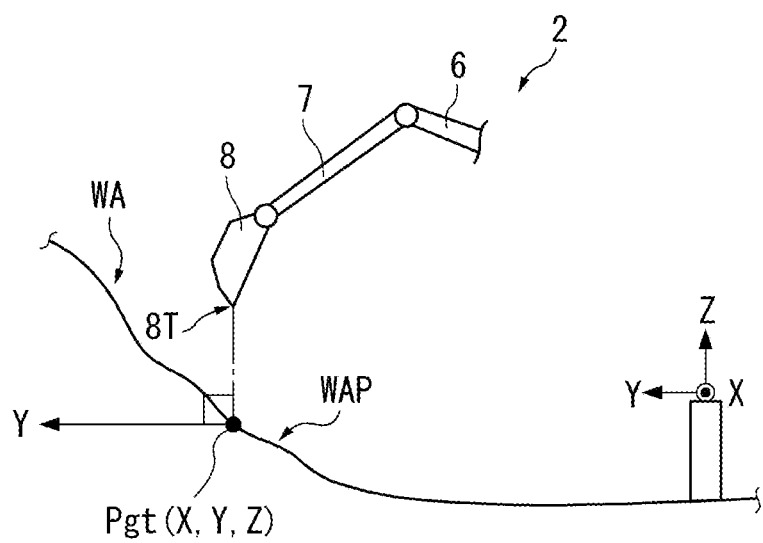
FIG. 17 is a diagram showing an image indicating a position of a bucket on the work target.
Figure 18:
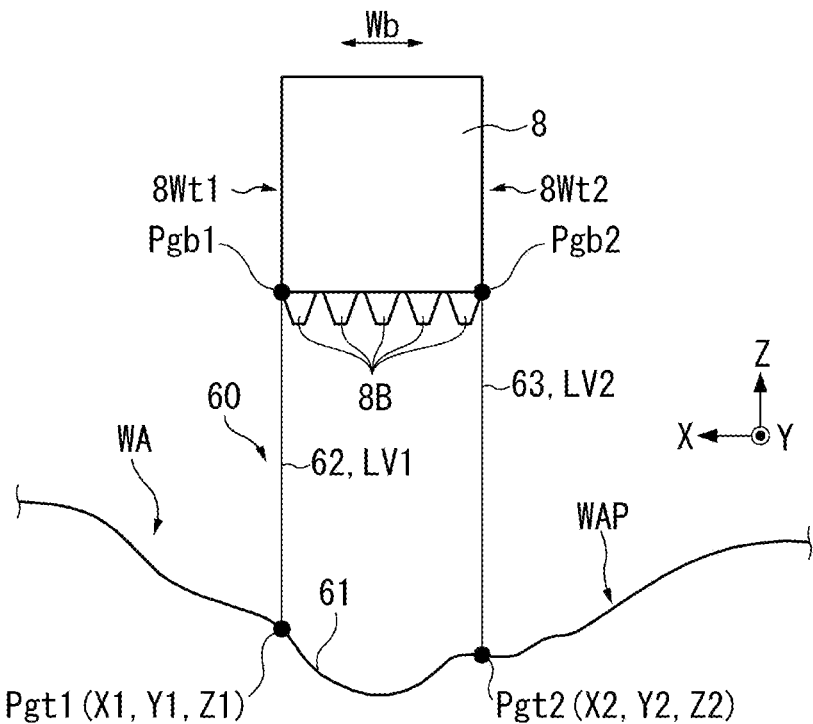
FIG. 18 is a diagram showing an image indicating the position of the bucket on the work target.
Figure 19:
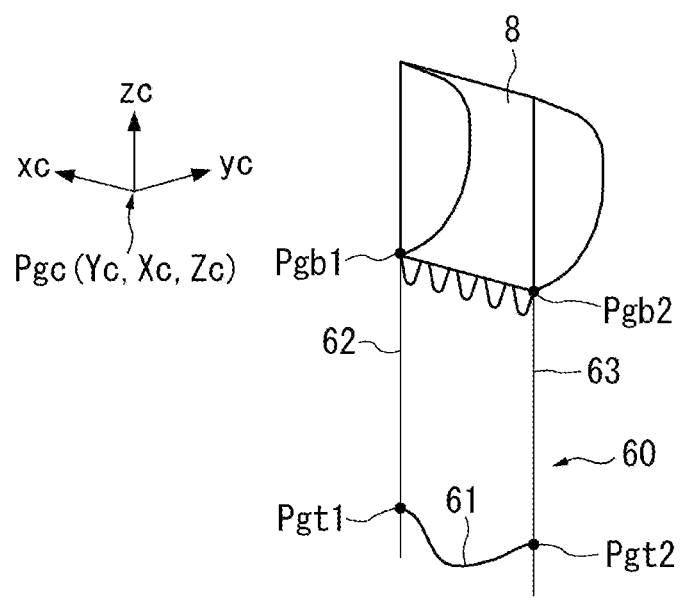
FIG. 19 is a diagram showing an image indicating the position of the bucket on the work target.

FIGS. 17 to 19 are diagrams showing an image indicating the position of the bucket 8 on the work target WA. In the embodiment, the image indicating the position of the bucket 8 is an image indicating the position of the tooth 8T of the bucket 8 on the work target WA. Hereinafter, the image indicating the position of the tooth 8T of the bucket 8 is appropriately referred to as a tooth position image. As shown in FIG. 17, the tooth position image is an image that is defined by a position Pgt (X, Y, Z) of a surface WAP of the work target WA when the tooth 8T is projected onto the work target WA in a vertical direction, that is, a direction in which gravity acts. The vertical direction is the Z-direction in the global coordinate system (X, Y, Z) and is a direction perpendicular to the X-direction and the Y-direction.

As shown in FIG. 18, a line image that is formed along the surface WAP of the work target WA between a first position Pgt1 (X1, Y1, Z1) and a second position Pgt2 (X2, Y2, Z2) of the surface WAP of the work target WA is a tooth position image 61. The first position Pgt1 (X1, Y1, Z1) is an intersection between a straight line LV1 extending in the vertical direction from a position Pgb1 outside the blade 8B on one end portion 8Wt1 side of the bucket 8 in a width direction Wb and the surface WAP of the work target WA. The second position Pgt2 (X2, Y2, Z2) is an intersection between a straight line LV2 extending in the vertical direction from a position Pgb2 outside the blade 8B on the other end portion 8Wt2 side of the bucket 8 in the width direction Wb and the surface WAP of the work target WA. The width direction Wb of the bucket 8 is a direction in which a plurality of blades 8B are arranged.

The processing device 51 obtains the straight line LV1 and the straight line LV2 extending in the vertical direction from the position Pgb1 and the position Pgb2 of the bucket 8, with the display processing unit 51P4. Next, the processing device 51 obtains the first position Pgt1 (X1, Y1, Z1) and the second position Pgt2 (X2, Y2, Z2) from the obtained straight line LV1 and straight line LV2 and information regarding the shape of the work target WA with the display processing unit 51P4. Then, the processing device 51 defines a set of positions Pgt of the surface WAP when a straight line connecting the first position Pgt1 and the second position Pgt2 is projected onto the surface WAP of the work target WA, as the tooth position image 61 with the display processing unit 51P4.

In the embodiment, the processing device 51 generates a first straight line image 62 that is an image of the straight line LV1 connecting the position Pgb1 and the first position Pgt1 (X1, Y1, Z1) and a second straight line image 63 that is an image of the straight line LV2 connecting the position Pgb2 and the second position Pgt2 (X2, Y2, Z2), with the display processing unit 51P4. Next, the processing device 51 converts the tooth position image 61, the first straight line image 62, and the second straight line image 63 into an image with the imaging device 19 as a reference, that is, an image viewed from the imaging device 19, with the display processing unit 51P4.

As shown in FIG. 19, the image viewed from the imaging device 19 is an image as the tooth position image 61, the first straight line image 62, and the second straight line image 63 are viewed from the origin Pgc (Xc, Yc, Zc) of the imaging device in the global coordinate system (X, Y, Z). The origin Pgc (Xc, Yc, Zc) of the imaging device is coordinates obtained by converting the center of the light receiving surface 19P of the imaging element 19RC provided in the imaging device 19, that is, the origin PC into the global coordinate system (X, Y, Z).

While the tooth position image 61, the first straight line image 62, and the second straight line image 63 are images in a three-dimensional space, and the image viewed from the imaging device 19 is a two-dimensional image. Accordingly, the processing device 51 executes perspective projection conversion to project the tooth position image 61, the first straight line image 62, and the second straight line image 63 defined in the three-dimensional space, that is, in the global coordinate system (X, Y, Z) onto a two-dimensional plane, with the display processing unit 51P4. Hereinafter, the tooth position image 61, the first straight line image 62, and the second straight line image 63 converted into the image viewed from the imaging device 19 are appropriately referred to as a work tool guide image 60.

Figure 20:
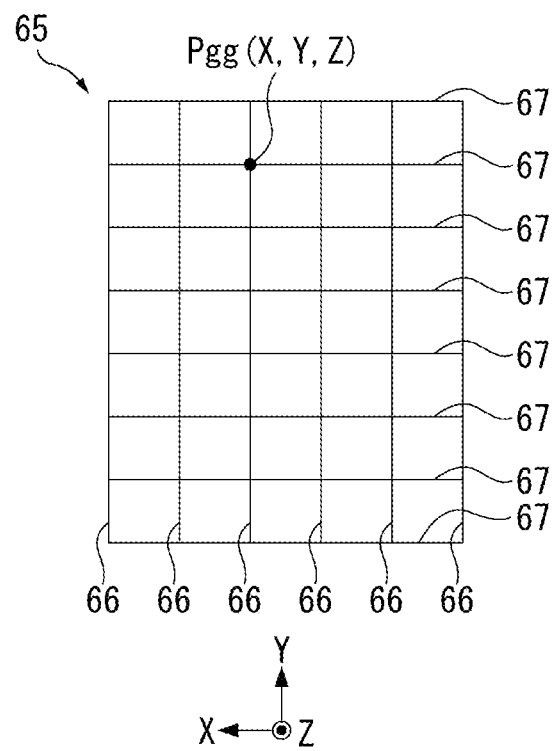
FIG. 20 is a diagram showing a lattice image as a reference image.
Figure 21:
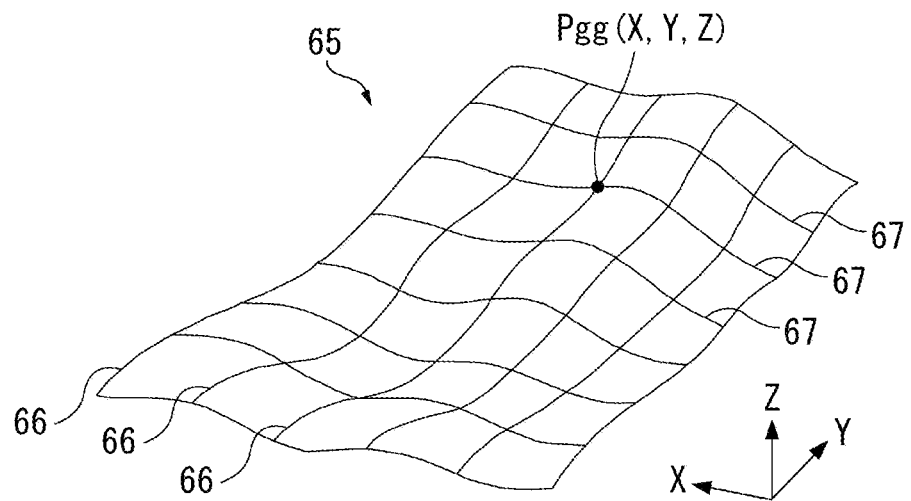
FIG. 21 is a diagram showing the lattice image as a reference image.

FIGS. 20 and 21 are diagrams showing the lattice image 65 that is a reference image. After the work tool guide image 60 is generated, the process progresses to Step S108, and the processing device 51 generates the lattice image 65 that is a reference image, with the display processing unit 51P4. The lattice image 65 is a line image along the surface WAP of the work target WA using information regarding the position of the work target WA. The lattice image 65 is a lattice including a plurality of first line images 66 and a plurality of second line images 67 intersecting a plurality of first line images 66. In the embodiment, the first line image 66 is, for example, a line image that extends in parallel with the X-direction in the global coordinate system (X, Y, Z) and is disposed in the Y-direction. In the global coordinate system (X, Y, Z), the first line image 66 may be a line image that extends in parallel with the front-rear direction of the upper swing body 3 provided in the hydraulic excavator 1 and is disposed in the width direction of the upper swing body 3.

The lattice image 65 is generated using information regarding the position of the work target WA, and more specifically, a position Pgg (X, Y, Z) of the surface WAP. An intersection of the first line image 66 and the second line image 67 is the position Pgg (X, Y, Z). As shown in FIG. 21, the first line image 66 and the second line image 67 are defined by the global coordinate system (X, Y, Z), and thus, include three-dimensional information. In the embodiment, a plurality of first line images 66 are disposed at equal intervals, and a plurality of second line images 67 are disposed at equal intervals. An interval between adjacent first line images 66 is equal to an interval between adjacent second line images 67.

The lattice image 65 is an image obtained by converting the first line image 66 and the second line image 67 generated using the position Pgg (X, Y, Z) of the surface WAP into the image viewed from the imaging device 19. The processing device 51 generates the first line image 66 and the second line image 67, and then, converts these images into the image viewed from the imaging device 19 to generate the lattice image 65, with the display processing unit 51P4. The first line image 66 and the second line image 67 are converted into the image viewed from the imaging device 19, whereby the lattice image 65 having an equal interval on the horizontal plane can be deformed and displayed in conformity with the shape of the work target WA to assist an absolute distance of the work target WA.

Next, in Step S109, the processing device 51 removes the above-described occupied area SA from the generated work tool guide image 60 and the lattice image 65 that is the reference image, with the display processing unit 51P4. In Step S109, the processing device 51 converts the occupied area SA into the image viewed from the imaging device 19 and removes the work tool guide image 60 and the lattice image 65 that is the reference image, with the display processing unit 51P4. In the embodiment, the processing device 51 may remove the occupied area SA before being converted into the image viewed from the imaging device 19, from the tooth position image 61, the first straight line image 62, and the second straight line image 63 before being converted into the image viewed from the imaging device 19, and the first line image 66 and the second line image 67 before being converted into the image viewed from the imaging device 19, with the display processing unit 51P4.

Figure 22:
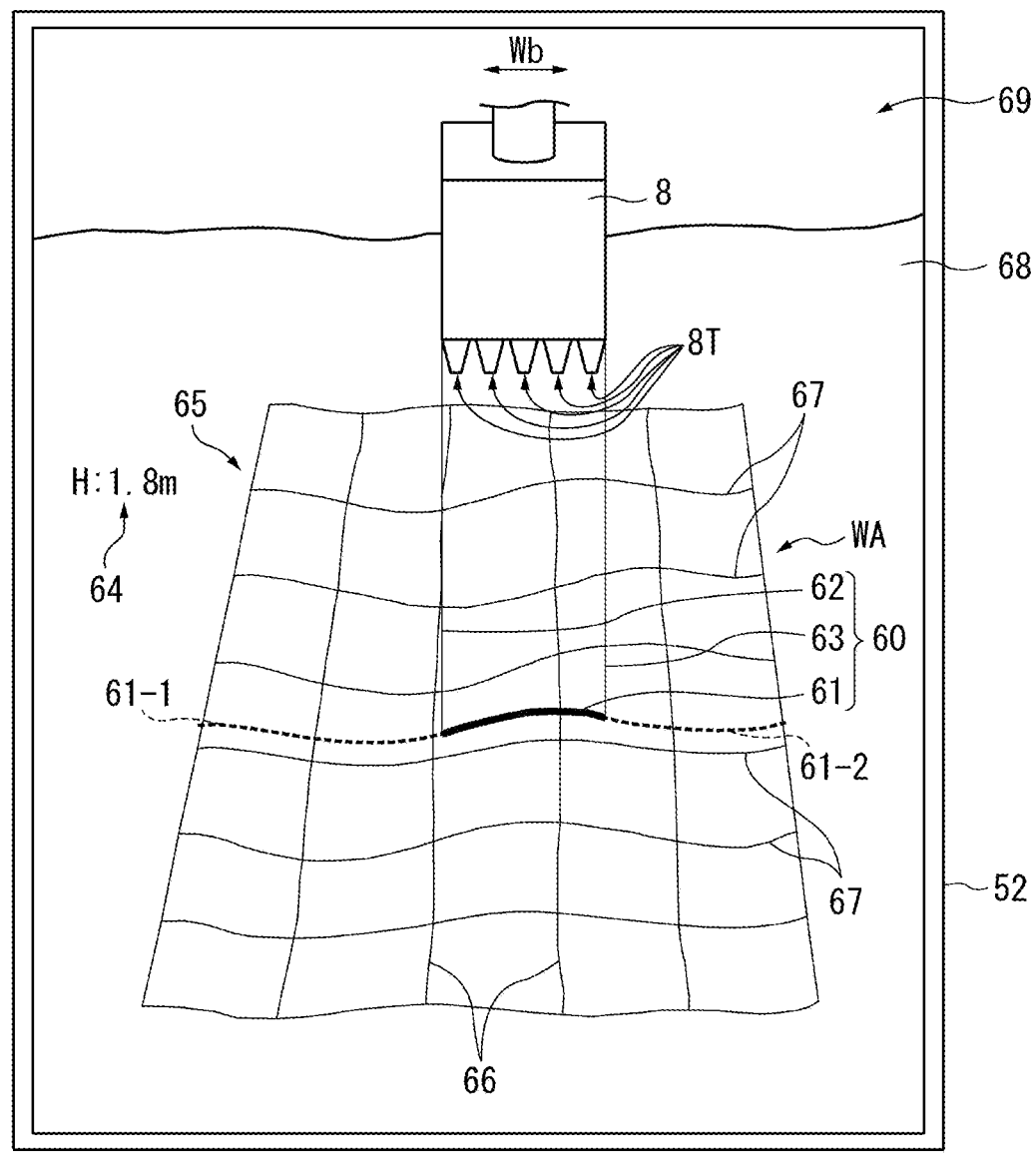
FIG. 22 is a diagram showing an image for work.

FIG. 22 is a diagram showing an image 69 for work. In Step S110, the processing device 51 combines the work tool guide image 60 with the occupied area SA removed, the lattice image 65, and the image 68 of the work target WA captured by the imaging device 19 to generate the image 69 for work, with the display processing unit 51P4. In Step S111, the processing device 51 displays the generated image 69 for work on the display device 52, with the display processing unit 51P4. The image 69 for work is an image in which the lattice image 65 and the work tool guide image 60 are displayed on the image 68 of the work target WA.

Since the lattice image 65 has a lattice along the surface WAP of the work target WA, the operator of the hydraulic excavator 1 can recognize the position of the work target WA by referring to the lattice image 65. For example, the operator can recognize a depth, that is, the position of the upper swing body 3 provided in the hydraulic excavator 1 in the front-rear direction with the second line image 67 and can recognize the position of the bucket 8 in the width direction with the first line image 66.

In the work tool guide image 60, the tooth position image 61 is displayed along the surface WAP of the work target WA and the lattice image 65. In an example shown in FIG. 22, an extension line image 61-1 and an extension line image 61-2 extending from the tooth position image 61 are also displayed along the surface WAP of the work target WA and the lattice image 65. For this reason, since the operator can recognize a positional relationship between the bucket 8 and the work target WA with the lattice image 65 and the tooth position image 61, work efficiency and work accuracy are improved. In the embodiment, the first straight line image 62 and the second straight line image 63 connect both ends of the tooth position image 61 from both sides of the bucket 8 in the width direction Wb. The operator can more easily recognize the positional relationship between the bucket 8 and the work target WA with the first straight line image 62 and the second straight line image 63. Since the lattice image 65 and the tooth position image 61 are displayed along the shape of a terrain (work target WA) to be worked, a relative positional relationship between the bucket 8 and the work target WA on a terrain surface (two-dimensionally) can be easily recognized. In addition, since the first line images 66 and the second line images 67 that constitute the lattice image 65 are displayed at equal intervals in the global coordinate system, a sense of distance on the terrain surface is easily recognized, and a sense of perspective is easily recognized.

In the embodiment, the image 69 for work includes information 64 indicating a distance between the tooth 8T of the bucket 8 and the work target WA. With such a configuration, there is an advantage that the operator can recognize an actual distance between the tooth 8T of the bucket 8 and the work target WA. The distance between the tooth 8T of the bucket 8 and the work target WA can be a distance between the tooth 8T at the center of the bucket 8 in the width direction Wb and the surface WAP of the work target WA.

Information 64 may be spatial position information regarding the work tool or the work target WA, including information, such as information regarding a posture, for example, the angle of the bucket 8, information indicating a relative distance between the bucket 8 and the work target WA, information indicating a relationship between an orientation of, for example, the tooth 8T of the bucket 8 and an orientation of the surface of the work target WA, information indicating the position of the bucket 8 by coordinates, information indicating the orientation of the surface of the work target WA, and information indicating a distance between the imaging device 19 and the tooth 8T of the bucket 8 in the y-direction in the local coordinate system, instead of or in addition to the distance between the tooth 8T of the bucket 8 and the work target WA.

That is, the processing device 51 may obtain at least one of the position of the bucket 8 as the work tool, the posture of the bucket 8, the position of the work target WA, a relative posture of the work target WA, the relative distance between the bucket 8 and the work target WA, and a relative posture of the bucket 8 and the work target WA and may display the obtained information on the display device 52, with the display processing unit 51P4.

As described above, the image display system 100 and the remote operation system 101 displays, on the display device 52, an image in which the work tool guide image 60 and the lattice image 65 generated as viewed from the imaging device 19 are superimposed on the image 68 of the actual work target WA captured by the imaging device 19. Through such processing, the image display system 100 and the remote operation system 101 can be configured such that the operator who remotely operates the hydraulic excavator 1 using the image of the work target WA displayed on the display device 52 can easily recognize the positional relationship between the position of the bucket 8 and the work target WA, and thus, work efficiency and work accuracy can be improved. Even an inexperienced operator can easily recognize the positional relationship between the position of the bucket 8 and the work target WA using the image display system 100 and the remote operation system 101. As a result, degradation of work efficiency and work accuracy is suppressed. Furthermore, the image display system 100 and the remote operation system 101 displays the work tool guide image 60, the lattice image 65, and the image 68 of the actual work target WA on the display device 52 in a superimposed manner, whereby a single screen to which the operator pays attention during work is required, and work efficiency can be improved.

In the lattice image 65, the interval between adjacent first line images 66 is equal to the interval between adjacent second line images 67. For this reason, the lattice image 65 and the image 68 of the actual work target WA captured by the imaging device 19 are displayed in a superimposed manner, whereby a work point on the work target WA is easily recognized. The tooth position image 61 of the work tool guide image 60 and the lattice image 65 are superimposed, whereby the operator easily recognizes a movement distance of the bucket 8, and thus, work efficiency is improved.

Since the occupied area SA that is the area of the work equipment 2 is removed from the work tool guide image 60 and the lattice image 65, the work tool guide image 60 and the lattice image 65 can be prevented from being distorted due to the occupied area SA and the work tool guide image 60 and the lattice image 65 can be prevented from being displayed on the work equipment 2 in a superimposed manner. As a result, the image display system 100 and the remote operation system 101 can display the image 69 for work on the display device 52 in a visible form for the operator.

In the embodiment, the work tool guide image 60 may include at least the tooth position image 61. The lattice image 65 may include at least a plurality of second line images 67, that is, a plurality of line images indicating the direction perpendicular to the front-rear direction of the upper swing body 3 provided in the hydraulic excavator 1. Furthermore, the processing device 51 may change the color of the tooth position image 61 in the work tool guide image 60 depending on the distance between the tooth 8T of the bucket 8 and the work target WA. With such a configuration, the operator easily recognizes the distance between the position of the bucket 8 and the work target WA.

In the embodiment, although the processing device 51 converts information regarding the shape of the work target WA into the global coordinate system (X, Y, Z) to generate the work tool guide image 60 and the lattice image 65, the processing device 51 may not convert information regarding the shape of the work target WA into the global coordinate system (X, Y, Z). In this case, the processing device 51 handles information regarding the shape of the work target WA in the local coordinate system (x, y, z) of the hydraulic excavator 1 and generates the work tool guide image 60 and the lattice image 65. In a case where information regarding the shape of the work target WA is handled in the local coordinate system (x, y, z) of the hydraulic excavator 1, the GNSS antennas 21 and 22 and the global position calculation device 23 are not required.

In the above-described embodiment, part (for example, the bucket 8 as described above) of the hydraulic excavator 1 detected by the distance detection device 20 is removed to obtain information (three-dimensional terrain data) regarding the shape of the work target WA. Note that three-dimensional terrain data acquired in the past (for example, several seconds ago) may be stored in the storage unit 51M of the processing device 51, and the processing unit 51P of the processing device 51 may determine whether or not the position of the current work target WA and the position indicated by the stored three-dimensional terrain data are identical, and in a case where both positions are identical, may display the lattice image 65 using past three-dimensional terrain data. That is, even though a terrain is hidden by part of the hydraulic excavator 1 as viewed from the imaging device 19, in a case where there is past three-dimensional topographic data, the processing device 51 can display the lattice image 65.

The lattice image 65 may be displayed, for example, using a local coordinate system as a polar coordinate system, instead of displaying the lattice image 65 using the lattice. Specifically, concentric circles at equal intervals depending on a distance from the center of the hydraulic excavator 1 (for example, the swing center of the upper swing body 3) may be drawn as line images (second line images), and radial line images (first line images) at equal intervals from the swing center may be drawn depending on a swing angle of the upper swing body 3. In this case, the second line images that the concentric circle line images intersect the first line image that are the radial line images from the swing center. Such a lattice image is displayed, whereby it is also possible to easily recognize the positional relationship between the position of the bucket 8 and the work target WA at the time of swing or excavation.

<Modification Example of Control System of Hydraulic Excavator 1>

Although the image display system 100 and the remote operation system 101 described above remotely operate the hydraulic excavator 1 using the operation device 53 of the facility 50 shown in FIG. 1, the display device 52 may be provided in the cab 4 shown in FIG. 2 or the image 69 for work may be displayed on the display device 52 in the cab 4 to assist the work of the operator for the hydraulic excavator 1. In this case, the hydraulic excavator 1 can be configured such that the operator who operates the hydraulic excavator 1 using the image of the work target WA displayed on the display device 52 easily recognizes the positional relationship between the position of the bucket 8 and the work target WA. As a result, work efficiency and work accuracy can be improved. Furthermore, even an inexperienced operator can easily recognize the positional relationship between the position of the bucket 8 and the work target WA. As a result, degradation of work efficiency and work accuracy is suppressed. In addition, in night work or the like, even though the operator hardly sees the actual work target WA, the operator can perform work while viewing the work tool guide image 60 and the lattice image 65 displayed on the display device 52, and thus, degradation of work efficiency is suppressed.

Although the embodiment has been described above, the embodiment is not limited by the content described above. Furthermore, the above-described components include those that can be easily assumed by those skilled in the art, substantially the same one, and so-called equivalents. In addition, the above-described components can be appropriately combined. Moreover, at least one of various omissions, substitutions, and alterations of the components can be performed without departing from the spirit and scope of the embodiment. The work machine is not limited to the hydraulic excavator 1, and may be other work machines, such as a wheel loader or a bulldozer.

INDUSTRIAL APPLICABILITY

According to the above-described disclosure of the invention, it is possible to reduce an error in determination about whether or not to remove a portion corresponding to a work machine in measurement data.

REFERENCE SIGNS LIST

1: Hydraulic excavator
1B: Vehicle body
1S: Control system
2: Work equipment
3: Upper swing body
4: Driver's seat Cab
6: Boom
7: Arm
8: Bucket
8B: Blade
8T: Tooth
16: First stroke sensor
17: Second stroke sensor
18: Third stroke sensor
19: Imaging device
20: Distance detection device
21, 22: Antenna (GNSS antenna)
23: Global position calculation device
26: Sensor controller
27: Work equipment control device
32: Posture detection device
33: IMU
50: Facility
51: Processing device
52: Display device
53: Operation device
60: Work tool guide image (image)
61: Tooth position image
62: First straight line image
63: Second straight line image
65: Lattice image
66: First line image
67: Second line image
68: Image
69: Image for work
100: Image display system for work machine (map generation system)
101: Remote operation system for work machine (remote operation system)

What is claimed is:

1. A map generation system comprising:
a processor configured to:
acquire measurement data from a scanning distance measurement sensor measuring a distance to a target to be measured;
acquire operation information representing an operation of a work machine occurring in a cycle of update of the measurement data by the scanning distance measurement sensor; and
remove a portion corresponding to the work machine in the measurement data based on information interpolating between the operation information acquired at a scanning start time of the scanning distance measurement sensor and the operation information acquired at a scanning end time.

2. The map generation system according to claim 1, wherein the information is a work equipment model to which an interpolation angle information for interpolating between angle information of work equipment of the work machine acquired at a scanning start time of the scanning distance measurement sensor and angle information of the work equipment acquired at a scanning end time is applied.

3. The map generation system according to claim 2, wherein the processor is further configured to display an image in which an image based on measurement data with the corresponding portion removed is superimposed on an image captured by an imaging device.

4. The map generation system according to claim 1, wherein the processor is configured to remove the portion corresponding to the work machine based on the operation information with a position of an end portion of a work tool of the work machine in the cycle of the update in the measurement data as a reference.

5. The map generation system according to claim 4, wherein the processor is further configured to display an image in which an image based on measurement data with the corresponding portion removed is superimposed on an image captured by an imaging device.

6. The map generation system according to claim 1, wherein the processor is further configured to display an image in which an image based on measurement data with the corresponding portion removed is superimposed on an image captured by an imaging device.

7. The map generation system according to claim 1, wherein the operation information includes a position of the work machine and a posture of work equipment of the work machine.

8. A map generation method comprising the steps of:

acquiring, by a processor, measurement data from a scanning distance measurement sensor measuring a distance to a target to be measured;

acquiring, by a processor, operation information representing an operation of a work machine occurring in a cycle of update of the measurement data by the scanning distance measurement sensor; and removing, by a processor, a portion corresponding to the work machine in the measurement data based on information interpolating between the operation information acquired at a scanning start time of the scanning distance measurement sensor and the operation information acquired at a scanning end time.

\* \* \* \* \*